United States Patent
Kozawa et al.

(10) Patent No.: US 7,373,815 B2
(45) Date of Patent: *May 20, 2008

(54) THERMAL TYPE FLOW MEASURING INSTRUMENT WITH MOLD CASING IN METAL INSERT

(75) Inventors: Masayuki Kozawa, Hitachinaka (JP); Shinya Igarashi, Naka (JP); Nobuhito Hiramatsu, Hitachinaka (JP); Naoki Saito, Tokai (JP); Hiromu Kikawa, Hitachinaka (JP)

(73) Assignees: Hitachi, Ltd., Tokyo (JP); Hitachi Car Engineering Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/203,206

(22) Filed: Aug. 15, 2005

(65) Prior Publication Data

US 2006/0027016 A1 Feb. 9, 2006

Related U.S. Application Data

(63) Continuation of application No. 10/603,685, filed on Jun. 26, 2003, now Pat. No. 7,010,972.

(30) Foreign Application Priority Data

Jun. 28, 2002 (JP) .............................. 2002-189019

(51) Int. Cl.
 *G01F 1/68* (2006.01)
(52) U.S. Cl. ................................ 73/204.22; 73/204.23
(58) Field of Classification Search .............. 73/204.22, 73/204.23
 See application file for complete search history.

(56) References Cited

U.S. PATENT DOCUMENTS

| | | | |
|---|---|---|---|
| 4,823,462 A | 4/1989 | Huber | 73/118 |
| 5,186,044 A | 2/1993 | Igarashi et al. | 73/204.22 |
| 5,400,639 A | 3/1995 | Caron et al. | 73/118.1 |
| 5,756,893 A | 5/1998 | Kondo et al. | 73/204.22 |
| 5,948,975 A | 9/1999 | Mueller et al. | 73/118.2 |

(Continued)

FOREIGN PATENT DOCUMENTS

EP 0441523 8/1991

(Continued)

OTHER PUBLICATIONS

English Translation-Detailed Description (JP09-038989A).

*Primary Examiner*—Harshad Patel
(74) *Attorney, Agent, or Firm*—Mattingly, Stanger, Malur & Brundidge, P.C.

(57) ABSTRACT

A thermal type air flow measuring instrument has a molded part formed by integral molding with a metal plate. A slot or opening allowing only a resin to pass through the same is formed in the metal plate in an area subjected to higher stresses. A part of the connector terminals are disposed in the vicinity of an area where the resin has a larger thickness and the temperature difference between the inside and the outside of the resin is locally increased. The injecting direction is set to prevent a weld line and a void from being generated. For the molded part with the metal plate inserted therein, the occurrence of cracks is minimized. Further, an increase of the fatigue crack growth rate is decreased.

10 Claims, 16 Drawing Sheets

U.S. PATENT DOCUMENTS 6,253,606 B1   7/2001   Yonezawa et al. ....... 73/204.26
7,010,972 B2 *  3/2006   Kozawa et al. .......... 73/204.22

FOREIGN PATENT DOCUMENTS

| EP | 0939303 | 11/1998 |
| JP | 09038989 A | 2/1997 |
| JP | 11-14423 | 1/1999 |
| JP | 11291286 | 10/1999 |

* cited by examiner

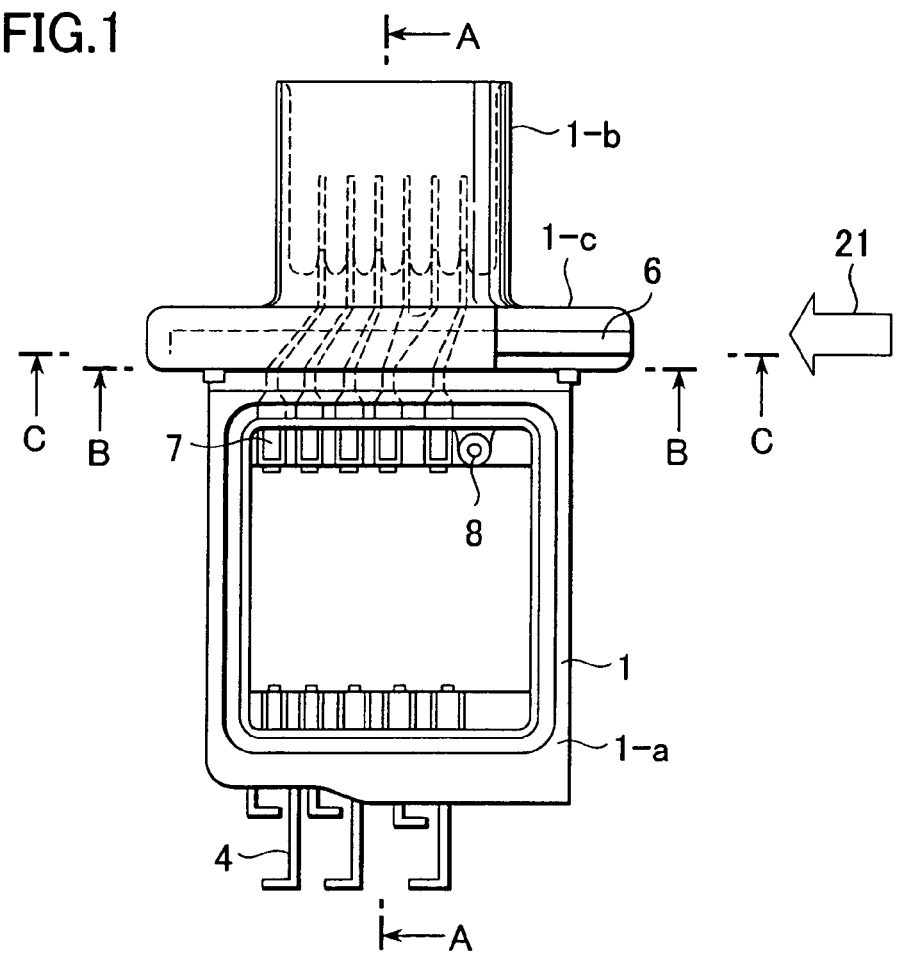
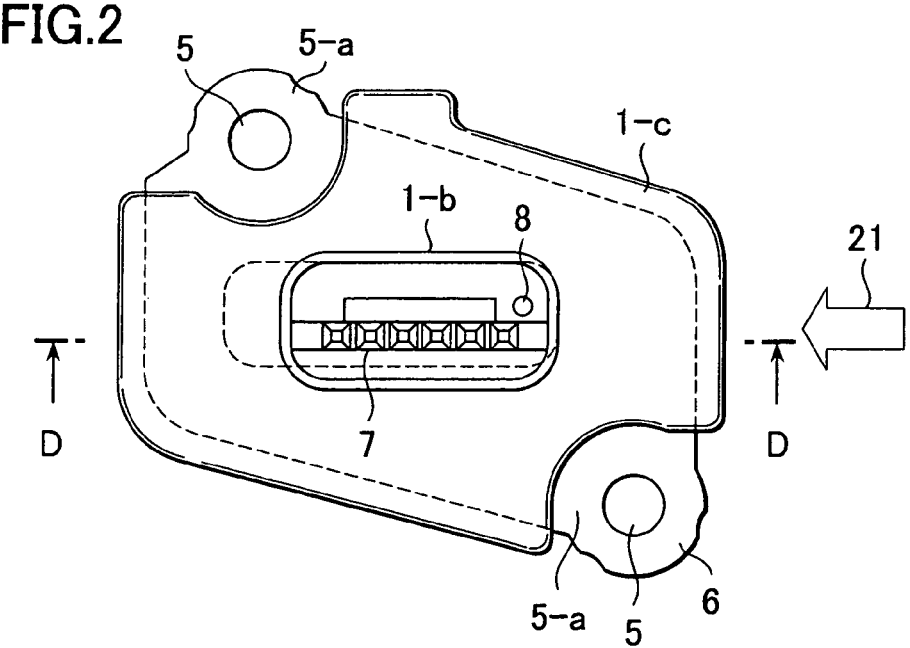

FIG.27
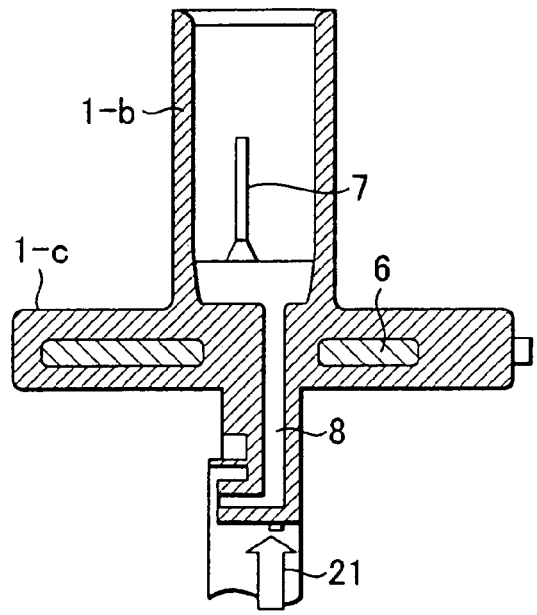
FIG.28
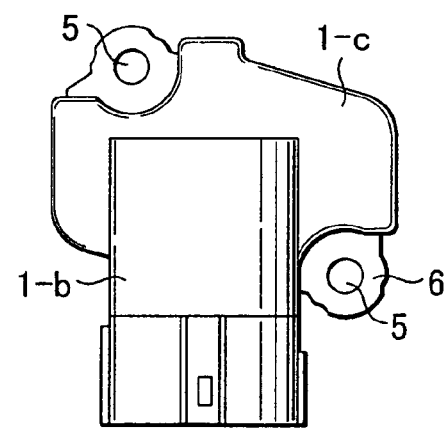
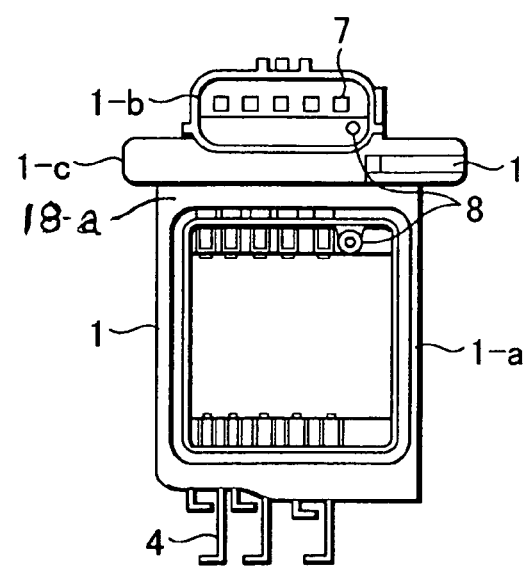

THERMAL TYPE FLOW MEASURING INSTRUMENT WITH MOLD CASING IN METAL INSERT

This is a continuation application of U.S. Ser. No. 10/603,685, filed Jun. 26, 2003 now U.S. Pat. No. 7,010,972.

BACKGROUND OF THE INVENTION

1. Field of the Invention

The present invention relates to a thermal type air flow measuring instrument for measuring an air flow taken into an internal combustion engine of an automobile, the instrument including a plastic part that is formed by integral molding with a metal part inserted therein.

2. Description of the Related Art

Japanese Publication of unexamined patent application No. 11-14423 discloses one example of the related art regarding a thermal type air flow measuring instrument using a molded part. In the disclosed instrument, a housing formed as a molded part comprises a frame shaped portion incorporating an electronic circuit therein and protecting it, a connector portion for electrical connection between an external device and the electronic circuit, and a fixing portion for fixing the thermal type air flow measuring instrument in place. Thus, the known thermal type air flow measuring instrument has a structure in which, by employing the housing, the electronic circuit is disposed in a flow duct and a metal base having mechanical strength is also disposed in the flow duct.

SUMMARY OF THE INVENTION

In the structure of the thermal type air flow measuring instrument disclosed in Japanese Publication of unexamined patent Application No. 11-14423, however, a component having relatively large mass is projected from a lower surface of a support. Stated otherwise, due consideration is not paid to reliability with regards to vibrations and, in particular, resonant frequency tends to lower. One conceivable solution to the above problem is integral molding to insert a metal plate having a high rigidity in the housing fixing portion and to cover the insert with a plastic mold. This structure is effective in preventing the lowering of resonant frequency, increasing reliability, and enabling the fixing portion to be fixed by screws with metal contact for improved convenience.

However, the above conceivable solution would raise the following problems. Because the housing fixing portion has a structure made up of two kinds of materials, i.e., a metal plate portion and a resin portion, stresses are caused upon a deformation due to a difference in thermal expansion coefficient between resin and metal, whereby cracks are produced in the resin portion of the housing fixing portion. Also, the cracks may produce in both the surface and the interior of the resin portion.

Accordingly, it is an object of the present invention to provide a physical quantity sensing instrument with high reliability, in which the occurrence of cracks due to a temperature difference in environment for use can be reduced when the instrument is of a structure where a metal plate is covered with a resin by integral molding.

The above object can be achieved with the features set forth in appended Claims.

BRIEF DESCRIPTION OF THE DRAWINGS

FIG. 1 is a front view of a molded part for use in a thermal type air flow measuring instrument according to a first embodiment of the present invention, the molded part being formed by integral molding with a metal plate inserted therein;

FIG. 2 is a plan view of the molded part, shown in FIG. 1, according to the first embodiment of the present invention;

FIG. 27 is a sectional view taken along line G-G in FIG. 26 and showing the fifth example of the principal portion of the molded part for use in the thermal type air flow measuring instrument according to the first embodiment of the present invention, the molded part being formed by integral molding with the metal plate inserted therein;

FIG. 28 is a set of plan view and a front view corresponding to FIG. 1 and showing another example of the molded part for use in the thermal type air flow measuring instrument according to the first embodiment of the present invention, the molded part being formed by integral molding with the metal plate inserted therein;

DESCRIPTION OF THE PREFERRED EMBODIMENTS

Figure 3:
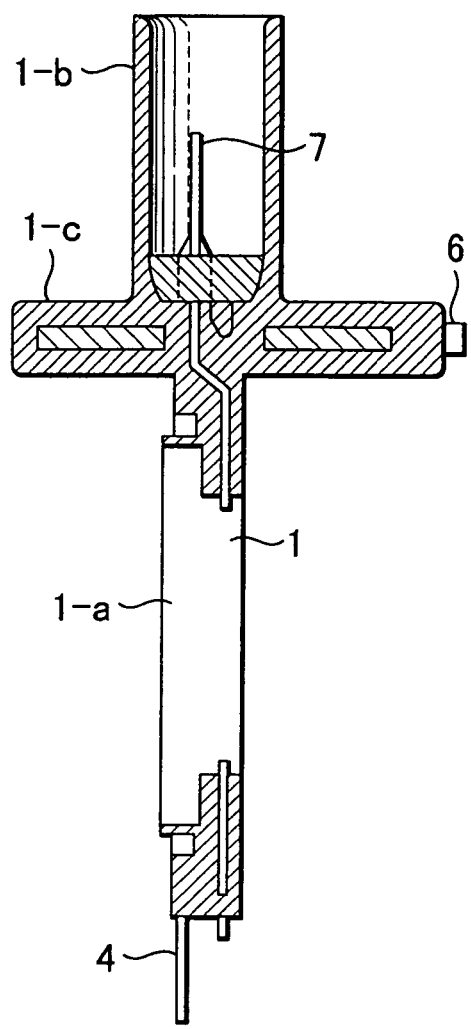
FIG. 3 is a sectional view, taken along line A-A in FIG. 1, of the molded part according to the first embodiment of the present invention.

As an ideal condition, it is desired to perfectly eliminate the occurrence of cracks. When a difficulty arises in perfectly eliminating the occurrence of cracks, it is particularly important to take a measure for preventing occurred cracks from developing or growing to such an extent as affecting reliability. To that end, the measure must be taken separately for suppressing the occurrence of cracks and for retarding the growth of cracks.

More specifically, it is important to employ a means based on the concept of material dynamics for suppressing the occurrence of cracks, and to employ a means based on the concept of breaking (rupture) dynamics for retarding the growth of cracks.

The concept of material dynamics implies a means for realizing a relation of "strength of a resin material>stress imposed on the resin material".

Also, the concept of breaking (rupture) dynamics implies a means for, when cracks are produced, retarding a fatigue crack growth rate da/dN of cracks to such an extent as not affecting reliability.

The fatigue crack growth rate is expressed by $da/dN=C \cdot \Delta K^m$, and an enlarging stress index width is expressed by:

$$\Delta K = \Delta \sigma_0 \sqrt{(\pi \cdot a)} \cdot F$$

($\sigma_0$: nominal stress, a: crack length (void size)/2, and F: stress concentration factor)

As seen from the above formula, the enlarging stress index width defining the fatigue crack growth rate is an index proportional to the root of the stress and the void size. To retard the fatigue crack growth rate, it is important to reduce the stress imposed on the resin material or to reduce the void size.

In a molded part having a structure in which a metal plate is covered with a plastic resin by integral molding, the following causes are responsible for generating cracks with a temperature difference in environment for use and growing cracks with fatigue:

Reduction of resin strength and growth of fatigue cracks due to a weld line generated with a mold flow, Growth of fatigue cracks and stress concentration due to voids generated during initial molding, Insufficient resin strength with respect to a product shape, For fiber reinforced plastic materials containing glass fibers, reduction of resin strength and growth of fatigue cracks due to a strength difference caused by different orientations of the glass fibers, and Thermal stresses caused upon a deformation due to a difference in thermal expansion coefficient between resin and metal.

In order to suppress the occurrence of cracks and retard the growth of fatigue cracks, measures must be separately taken for each of the above causes (1) to (5). Particularly, it is important that the measures be taken so as to avoid the above causes (1) to (5) from being combined with each other.

A description is now made of a weld line.

The term "weld line, implies a line at which two flows of injected resins join with each other. The presence of the weld line is a disadvantage intrinsic to injection molding. The weld line is generated for the following reasons; i.e., (1) there are two or more gates through which a resin is injected in the molding step, and (2) a resin injected in the molding step is divided into two or more flows, and then the divided flows of resins join with each other again. A disadvantage resulting from the presence of the weld line is a reduction of strength. The weld line having a reduced strength, in particular, is formed when the joined flows of resins are molded into a product, as they are, without moving any more.

As measures to be taken with regards to the weld line, therefore, it is important that the resin strength of a portion around the weld line be greater than stresses acting upon the vicinity of the weld line by forming the weld line in such a manner as, for example, to suppress the reduction of strength or to deviate from the vicinity of an area subjected to high stresses.

A manner of forming the weld line so as to suppress the reduction of strength will be described in more detail. The weld line having a reduced strength is formed, as described above, when the joined flows of resins are molded into a product, as they are, without moving any more and mixing with each other. Accordingly, the manner of suppressing the reduction of strength resulting from the presence of the weld line resides in, after joining of the flows of resins, moving the resins into a sufficiently mixed state so that the joined flows of resins will not molded into a product as they are without moving any more. This manner is especially effective when applied to fiber reinforced plastics containing glass fibers.

As a practical means to implement the above manner, the present invention employs a structure in which a metal plate has an opening allowing only the resin covering the metal plate to pass through it and formed in an area or thereabout that is subjected to stresses greater than the strength of the weld line. The area or thereabout subjected to the greater stresses implies an area or thereabout in which an outer periphery of the resin covering the metal plate merges with an outer periphery of the metal plate and which is easily subjected to thermal stresses caused upon a deformation due to a difference in thermal expansion coefficient between resin and metal.

With such a structure, it is possible to change flow speeds of resins covering upper and lower surfaces of the metal plate, and hence to change the position of the weld line. Accordingly, the weld line can be deviated from the area or thereabout where stresses become greater than the strength of the weld line.

Further, because the mold (resin) flow can be changed near the opening, the joined resins can be moved so as to promote mixing of the resins. In addition, because the resin flowing along one of the upper and lower surfaces of the metal plate at a higher resin flow speed (with the resin being cooled to a smaller extent) is caused to flow into the other surface (where the resin is cooled to a larger extent), the resins can be more easily mixed with each other and the reduction of strength resulting from the presence of the weld line can be suppressed.

In the case of using fiber reinforced plastic materials containing glass fibers, because the resin flowing into the opening from one surface flows out to the other surface, directions of the fibers near the opening are diffused. Also, resulting promotion in mixing of the joined resins enables directions of the fibers to more easily to orient in random after the joining of the resins. It is therefore possible to reduce a probability that the glass fibers are oriented in a uniform direction, and to provide stable strength.

Thus, the above-described structure provides the following advantageous features, i.e., (1) the position of the weld line can be adjusted, (2) the joined resins can be moved to promote mixing of the resins, and (3) in the case of using fiber reinforced plastic materials containing glass fibers, directions of the fibers can be diffused. As a result, it is possible to prevent the occurrence of cracks and to retard the fatigue crack growth rate, which would be otherwise caused or promoted with the presence of the weld line.

A description is now made of voids. The term "voids" implies vacant pores produced inside the molded part. The voids occur for the following reasons, i.e., (1) air is entrapped during the molding, and (2) there is a region in which the temperature difference between the inside and the outside of the resin is locally increased during the mold cooling. In a product including an insert part and having a complicated shape, particularly, the area in which the temperature difference between the inside and the outside of the resin is locally increased tends to easily occur and is responsible for generating a large void. Also, the size of a generated initial void affects the enlarging stress index that defines the fatigue crack growth rate. Therefore, an important measure is to retard the growth rate of a crack generated from the void to such an extent that reliability will not be affected. For realizing such a measure, it is important to make even the temperature difference between the inside and the outside of the resin, and to eliminate the occurrence of a large void, or to reduce the size of the produced void.

As a practical means to implement the above measure, the present invention employs a structure in which a connector terminal, i.e., another metal insert part penetrating the opening formed in the metal plate, is disposed so as to penetrate a resin portion located in the opening formed in the metal plate where the temperature difference between the inside and the outside of the resin tends to locally increase, and in which a part of a connector terminal, which is not required from the intrinsic object, is disposed in a resin portion where the temperature difference between the inside and the outside of the resin is locally increased. With such a structure, the temperature difference between the inside and the outside of the resin can be made even by utilizing thermal conductivity of the connector terminal as a metal part, a large void can be prevented from being generated in the initial stage, and the size of the generated void can be reduced.

It is hence possible to reduce the size of a void generated in the initial stage, to reduce the enlarging stress index, and to retard the fatigue crack growth rate.

While the measures taken in the present invention have been described for each of the weld line and the void, a description is now made of a measure for dealing with a combination of the weld line and the void.

Because the reduction of strength resulting from the presence of the weld line further accelerates an increase of the enlarging stress index caused by the presence of the void, the weld line causes cracks to easily generate and also expedites the crack growth rate due to fatigue. It is therefore important to prevent both the weld line and the void from being generated in a combined way.

As a practical means to implement the above measure, the present invention employs a structure in which a gate is disposed parallel to a connector terminal or a vent hole penetrating substantially perpendicular to a fixing surface of the metal plate, and the gate is provided corresponding to a resin portion where the connector terminal or the vent hole is provided. With such a structure, in the resin portion including the opening formed in the metal plate where the temperature difference between the inside and the outside of the resin tends to locally increase, an interference (obstacle) tending to easily generate a weld line, such as a connector terminal or a vent hole, and a void can be prevented from being generated in a combined way. Hence, the occurrence of cracks can be suppressed and, in particular, the fatigue crack growth rate can be retarded.

Embodiments of the present invention will be described below with reference to the drawings.

A description is first made of the occurrence of cracks and the growth of fatigue cracks resulting from the presence of a weld line.

Figure 4:
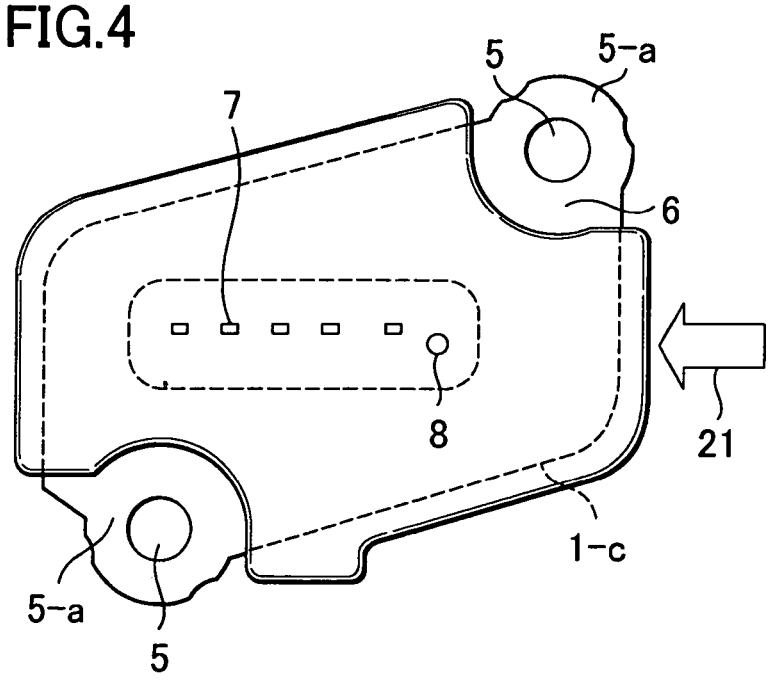
FIG. 4 is a sectional view, taken along line B-B in FIG. 1, of the molded part according to the first embodiment of the present invention.
Figure 5:
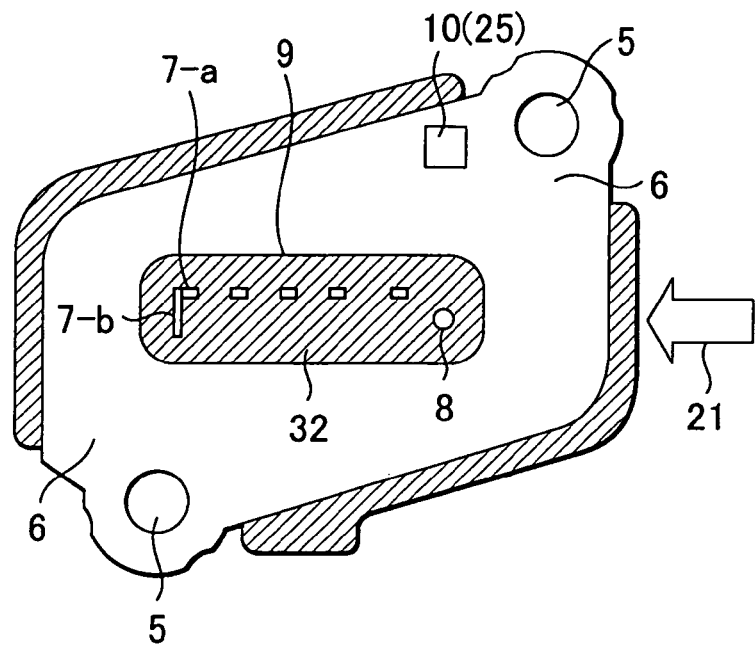
FIG. 5 is a sectional view, taken along line C-C in FIG. 1, of the molded part according to the first embodiment of the present invention.
Figure 6:
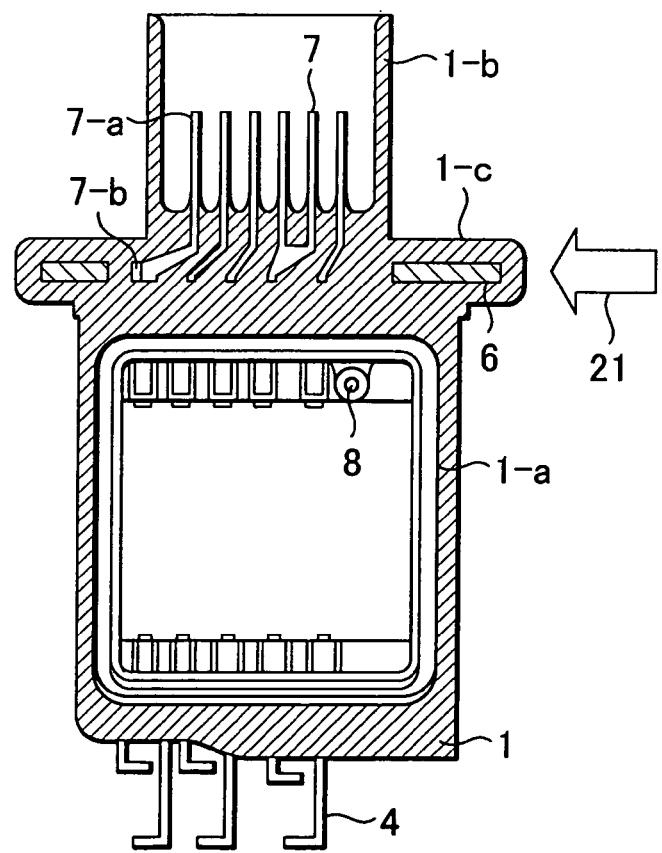
FIG. 6 is a sectional view, taken along line D-D in FIG. 2, of the molded part according to the first embodiment of the present invention.
Figure 7:
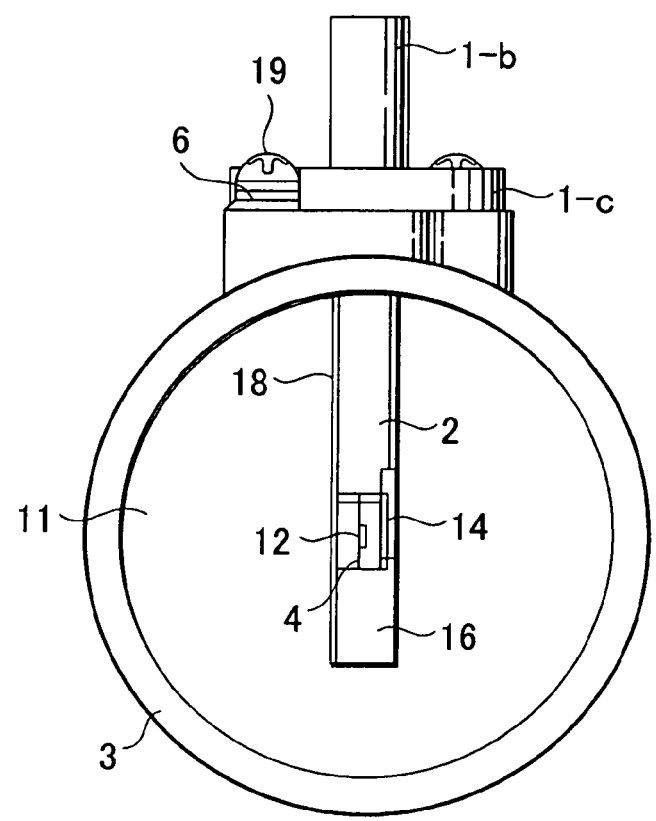
FIG. 7 shows a flow duct, as viewed from the upstream side, of the thermal type air flow measuring instrument using the molded part, shown in FIG. 1, according to the first embodiment of the present invention.
Figure 8:
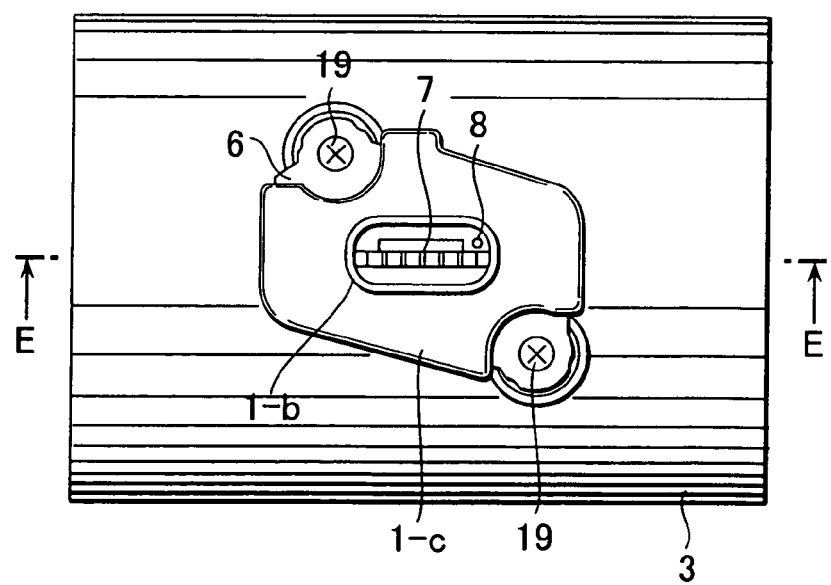
FIG. 8 is a plan view of the thermal type air flow measuring instrument, shown in FIG. 7, using the molded part, shown in FIG. 1, according to the first embodiment of the present invention.
Figure 9:
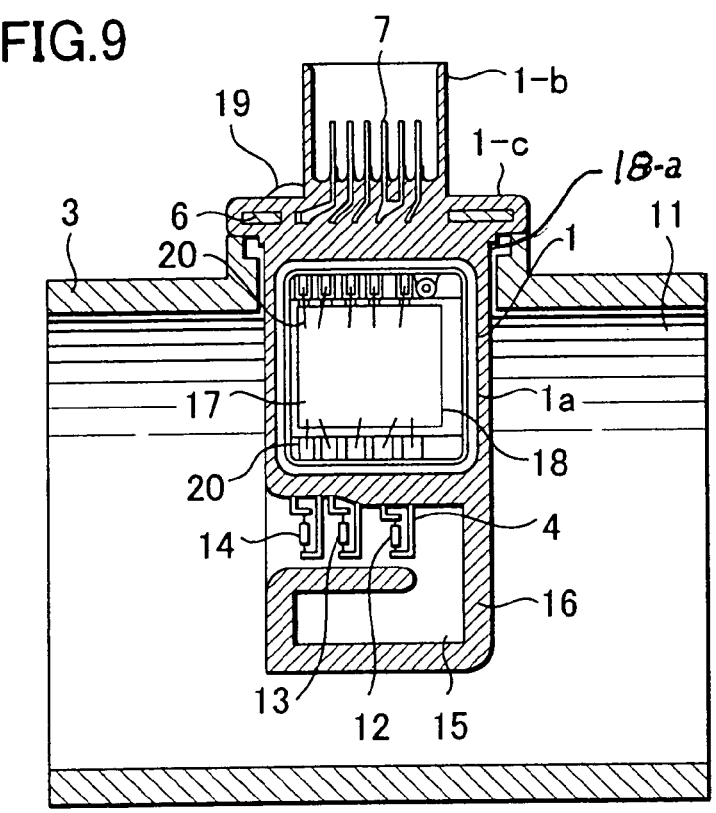
FIG. 9 is a sectional view, taken along line E-E in FIG. 8, of the thermal type air flow measuring instrument using the molded part, shown in FIG. 1, according to the first embodiment of the present invention.

FIG. 1 is a front view of a molded part for use in a thermal type air flow measuring instrument according to a first embodiment of the present invention, the molded part being formed by integral molding with a metal plate inserted therein, and FIG. 2 is a plan view of the molded part shown in FIG. 1. FIG. 3 is a sectional view of the molded part taken along line A-A in FIG. 1, FIG. 4 is a sectional view of the molded part taken along line B-B in FIG. 1, FIG. 5 is a sectional view of the molded part taken along line C-C in FIG. 1, and FIG. 6 is a sectional view of the molded part taken along line D-D in FIG. 2. FIG. 7 shows a flow duct, as viewed from the upstream side, in one embodiment of the thermal type air flow measuring instrument using the molded part shown in FIG. 1. FIG. 8 is a plan view of the thermal type air flow measuring instrument shown in FIG. 7, and FIG. 9 is a sectional view of the thermal type air flow measuring instrument taken along line E-E in FIG. 8.

A housing 1 comprises a frame shaped portion 1-*a* incorporating an electronic circuit therein and protecting it, a connector portion 1-*b* for electrical connection between the electronic circuit and an external device, and a fixing portion 1-*c* for fixing a thermal type air flow measuring instrument 2 in place. In the housing 1, the fixing portion 1-*c* is positioned between the frame shaped portion 1-*a* and the connector portion 1-*b*. Also, the fixing portion 1-*c* is disposed such that the thermal type air flow measuring instrument 2 is fixed substantially perpendicularly to an open surface of the frame shaped portion 1-*a*. Further, the frame shaped portion 1-*a* of the housing 1 includes electrically conductive supports 4 provided on the side opposed to the connector portion 1-*b* and supporting a heating resistor 12, a temperature sensing resistor 13, etc. The fixing portion 1-*c* includes a metal plate 6 provided with screw holes 5 used for fixing the thermal type air flow measuring instrument 2 to an air flow measuring body 3. The connector portion 1-*b* includes an electrically conductive connector terminal 7 penetrating the metal plate 6, which is inserted in the fixing portion 1-*c*, for electrical connection between the electronic circuit and the external device. The housing 1 is a fiber reinforced plastic part containing glass fibers, which is formed by integral molding together with the supports 4, the metal plate 6 and the connector terminal 7. The housing 1 has a vent hole 8 that serves to prevent an inner pressure in the frame shaped portion 1-*a* from increasing with a temperature rise. Opposite open end surfaces of the vent hole 8 are positioned respectively in the frame shaped portion 1-*a* and the connector portion 1-*b* of the housing 1. Further, the vent hole 8 is formed in the frame shaped portion 1-*a* on the side where the connector terminal 7 is disposed, and it has an L-shape in the frame shaped portion 1-*a* so that the end surface opened in the frame shaped portion 1-*a* is substantially parallel to the open surface of the frame shaped portion 1-*a*. The fixing portion 1-*c* has a structure of (resin+metal plate 6+resin), in which the metal plate 6 is covered with a resin. In other words, most of the fixing portion 1-*c* is covered with a resin except for screw fastening portions 5-*a* of the metal plate 6. Additionally, the metal plate 6 has the screw holes 5 for screw fastening, a substantially rectangular opening 9 through which the connector terminal 7 and the vent hole 8 penetrate, and a through portion 10 allowing only the resin covering the metal plate 6 to pass through the same.

In the air flow measuring body 3, there are formed a main passage 11 and an auxiliary passage 15 which is bent substantially in a C-like shape and includes the heating resistor 12 for detecting an air flow, the temperature sensing resistor 13 for sensing a temperature of intake air, and a temperature sensor 14 for measuring the temperature of intake air. The auxiliary passage 15 is constructed by fixing an auxiliary passage member 16, which constitutes most of the auxiliary passage, to a metal base 18 to which an electronic circuit 17 and the housing 1 are fixed. Also, the thermal type air flow measuring instrument 2 comprises the housing 1 and the auxiliary passage 15. Further, the housing 1 is formed as an integral unit by fixing, to it, the metal base 18, a cover 18-*a* covering an open surface of the housing, and the auxiliary passage member 16. The air flow measuring body 3 and the thermal type air flow measuring instrument 2 are fixed together by fastening screw 19 through the screw holes 5 formed in the metal plate 6, which is inserted in the fixing portion 1-*c* of the housing 1, such that the housing 1 and the electronic circuit 17 incorporated in the housing 1 for protection can be arranged within the main passage 11. Additionally, the electronic circuit 17, the supports 4, and the connector terminal 7 are electrically interconnection through aluminum wires 20 as conductive members.

An injecting direction 21 in molding of the housing 1 is set substantially perpendicular to the open surface of the housing frame-shaped portion 1-*a* and substantially parallel and straightforward to the screw fastening surface of the metal plate 6. By so setting the injecting direction 21, it is possible to bear the resin pressure generated during the injection molding in the direction of thickness of the metal plate 6, to avoid a deformation of the metal plate 6 with a high pressure produced during the injection molding, and to realize the molding in a satisfactory manner.

The occurrence of cracks and the growth of fatigue cracks resulting from the presence of a weld line in the housing 1 will be described below.

Figure 10:
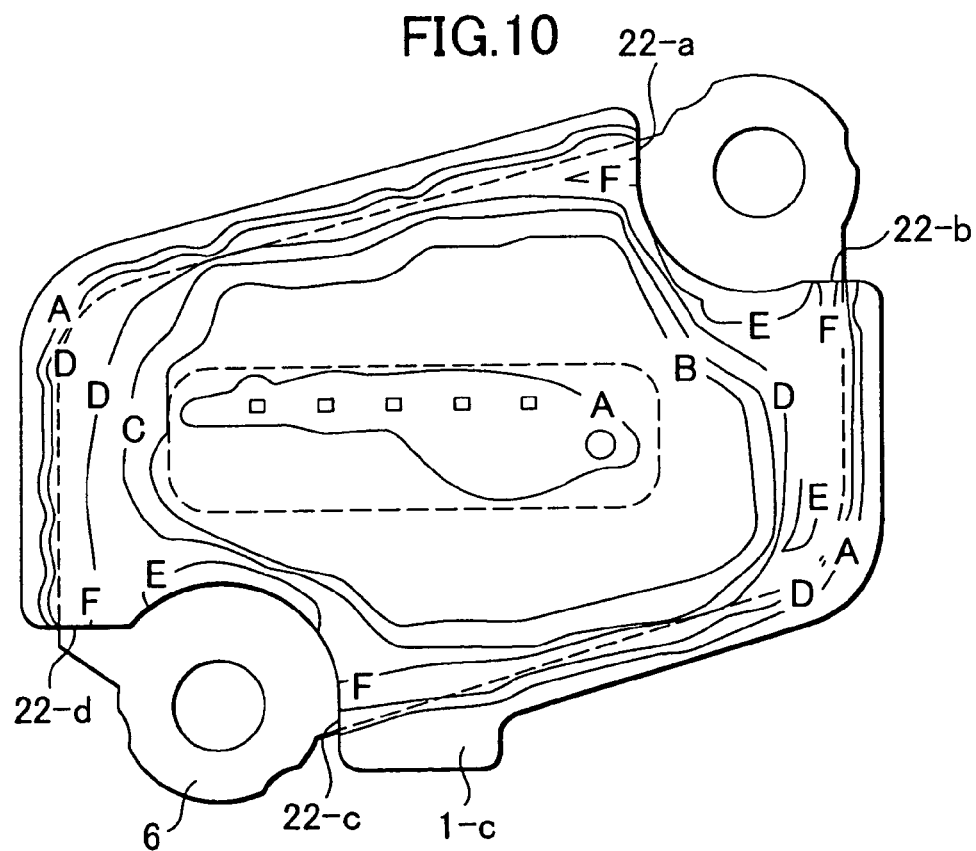
FIG. 10 shows a thermal stress distribution in a section corresponding to the sectional view taken along line B-B in FIG. 1 when the present invention is not implemented.
Figure 11A:
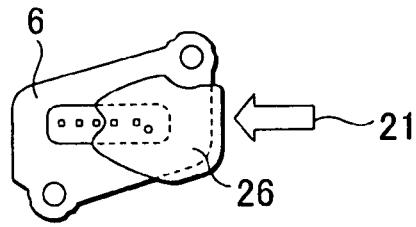
FIGS. 11A to 11E show a mold flow in the section corresponding to the sectional view taken along line B-B in FIG. 1 when the present invention is not implemented.
Figure 11B:
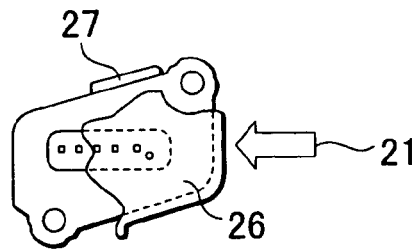
Figure 11C:
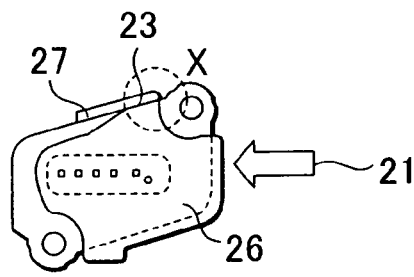
Figure 11D:
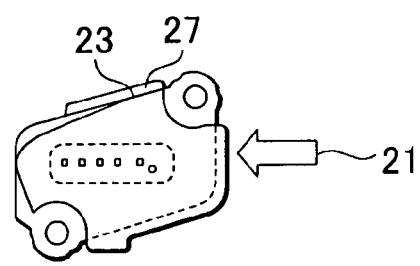
Figure 11E:
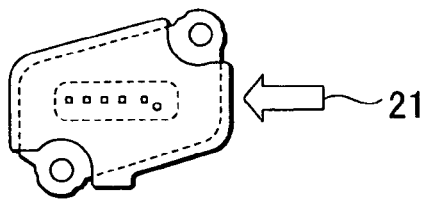
Figure 12:
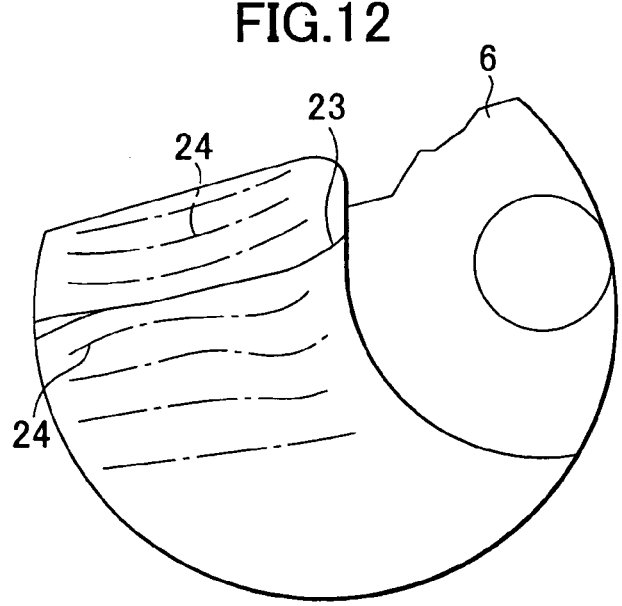
FIG. 12 is an enlarged view of a portion X in FIG. 11C when the present invention is not implemented.

A description is first made of the occurrence of cracks and the growth of fatigue cracks resulting from the presence of a weld line when the present invention is not implemented, i.e., when the through portion 10 allowing only the resin covering the metal plate 6 to pass through the same is not formed in the metal plate, with reference to FIGS. 10 to 13. FIG. 10 shows a thermal stress distribution in a section corresponding to the section taken along line B-B in FIG. 1. A, B, C, D, E and F in FIG. 10 represents magnitudes of thermal processes, which are in the relationship of A<B<C<D<E<F. FIGS. 11A to 11E show a mold flow during the molding in the section corresponding to the section taken along line B-B in FIG. 1. FIGS. 11A, 11B, 11C, 11D and 11E show the progress of the mold flow in sequence. FIG. 12 is an enlarged view of a portion X in FIG. 11C, the view showing in particular directions of glass fibers.

Because of the structure in which the metal plate 6 is covered with the resin, as shown in FIG. 10, thermal stresses are applied to the resin upon a deformation due to a difference in thermal expansion coefficient between the resin and the metal plate 6. Particularly, higher stresses are applied to areas 22-*a*, 22-*b*, 22-*c* and 22-*d* near four corners where an outer periphery of the resin covering the metal plate 6 merges with an outer periphery of the metal plate 6.

Also, in the vicinity of the area 22-*a* subjected to higher thermal stresses, as shown in FIGS. 11C and 11D, an upper resin 27 divided by the metal plate 6 and flowing along an upper surface of the metal plate 6 and a lower resin 26 flowing along a lower surface of the metal plate 6 join with each other, thereby generating a weld line 23. The weld line 23 is substantially parallel to the outer periphery of the metal plate 6 and substantially rectilinear, and provides a weld line around which the joined resins are molded into a product, as they are, without moving any more and hence the resin strength is reduced.

In the vicinity of the area 22-*a*, therefore, the reduction of resin strength resulting from the presence of the weld line 23 and concentration of thermal stresses upon a thermal deformation tend to easily occur in a combined way. As a result, the relationship of (resin material strength)<(stresses applied to the resin material) is more likely to satisfy and cracks are more apt to occur.

Further, as shown in FIG. 12, since the joined resins are molded into a product, as they are, without moving any more, glass fibers 24 contained in the resin are oriented substantially parallel to the weld line 23 without mixing with each other.

Figure 13:
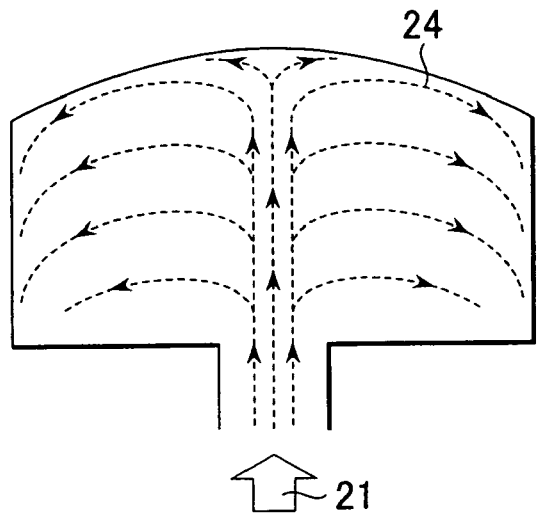
FIG. 13 shows the relationship between a direction of advance of resin and a direction of fibers.
Figure 14A:
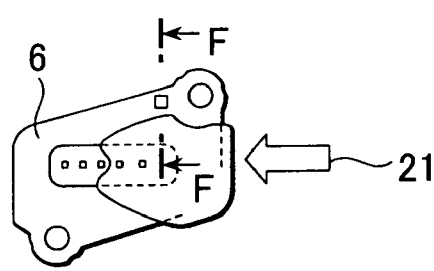
FIGS. 14A to 14E show a mold flow in the section corresponding to the sectional view taken along line B-B in FIG. 1 in the first embodiment of the present invention.
Figure 14B:
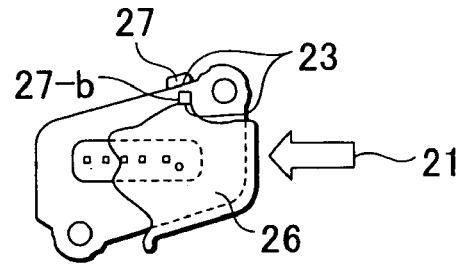
Figure 14C:
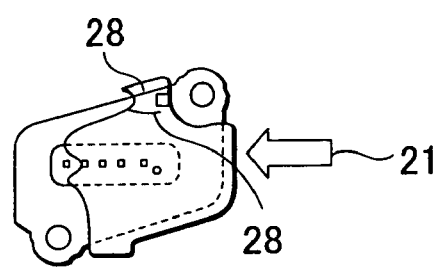
Figure 14D:
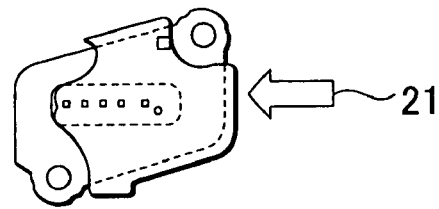
Figure 14E:
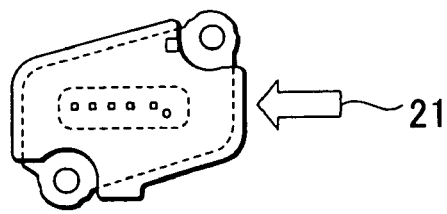

The direction of advance of the resin and the directions of the glass fibers 24 will now be described with reference to FIG. 13. As shown in FIG. 13, the glass fibers 24 are oriented relative to the injecting direction 21 similarly to the hand movement resulted when swimming in the breaststroke. Accordingly, the glass fibers 24 are oriented substantially perpendicular to the direction of advance of the resin. Hence, as shown in FIG. 12, the directions of the glass fibers 24 are oriented substantially parallel to the weld line 23.

Further, the tensile strength of the glass fibers 24 tends to lower as the orientation of the glass fibers 24 comes closer to a direction perpendicular to the tensile direction. In the vicinity of the area 22-*a*, therefore, the reduction of resin strength resulting from the orientation of the glass fibers 24 is caused in addition to the reduction of resin strength resulting from the presence of the weld line 23. As a result, the relationship of (resin material strength)<(stresses applied to the resin material) is more likely to satisfy and cracks are more apt to occur.

Then, the generated cracks progress in the direction in which the resin strength is reduced. Accordingly, there rectilinearly progresses the growth of fatigue cracks, which are generated near the linear weld line 23 under a condition that the reduction of resin strength resulting from the presence of the weld line 23 and the reduction of tensile strength resulting from the orientation of the glass fibers 24 are caused in a combined way. Hence, the fatigue crack growth rate is further accelerated with ease and the growth of cracks is promoted.

Thus, when the present invention is not implemented, the molded housing has a structure in which cracks tend to easily occur and the fatigue crack growth rate is accelerated due to the reduction of resin strength resulting from the presence of the weld line 23 and the orientation of the glass fibers 24 in a single or combined way.

Figure 15:
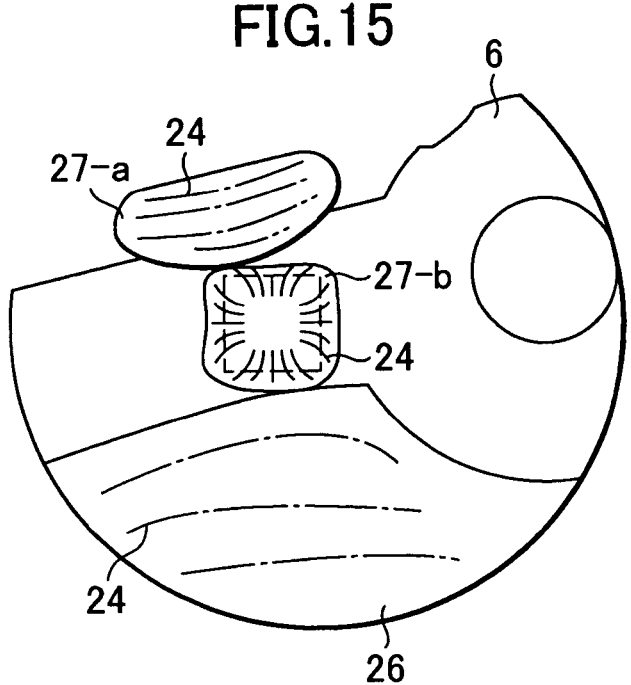
FIG. 15 is an enlarged view of the molded part, shown in FIG. 14, according to the first embodiment of the present invention, the view corresponding to the enlarged view of the portion X in FIG. 11.
Figure 16A:
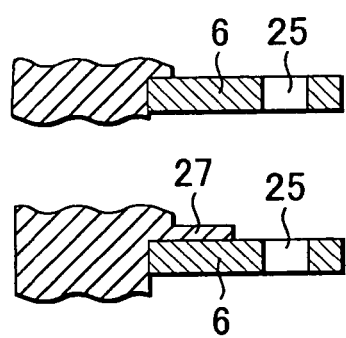
FIGS. 16A to 16E are each a sectional view, taken along line F-F in FIG. 14A, of the molded part according to the first embodiment of the present invention.
Figure 16B:
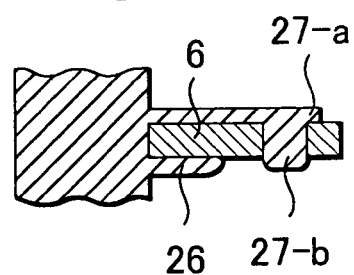
Figure 16C:
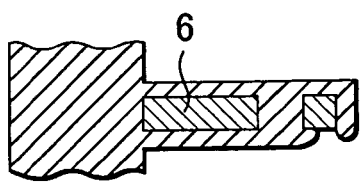
Figure 16D:
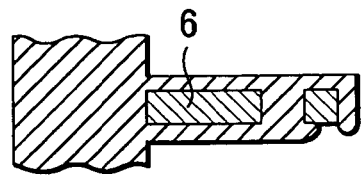
Figure 16E:
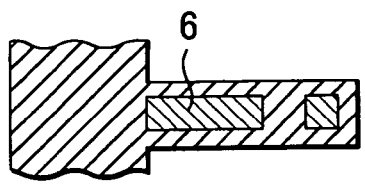

Measures for suppressing the occurrence of cracks and the growth of fatigue cracks due to the presence of the weld line in the embodiments of the present invention will be described below with reference to FIGS. 14 to 16. FIGS. 14A to 14E show a mold flow during the molding in the section corresponding to the section taken along line B-B in FIG. 1. FIGS. 14A, 14B, 14C, 14D and 14E show the progress of the mold flow in sequence. FIG. 15 is an enlarged view of a portion of FIG. 14 corresponding to the enlarged view, shown in FIG. 15, of the portion X in FIG. 11C, the view showing in particular directions of glass fibers. FIGS. 16A to 16E show a mold flow during the molding in a section corresponding to the section taken along line F-F in FIG. 14A. FIGS. 16A, 16B, 16C, 16D and 16E show the progress of the mold flow in sequence.

In the embodiment of the present invention, the metal plate 6 has a rectangular slot 25 formed as the through portion 10 allowing only the resin covering the metal plate 6 to pass through the same. Further, the rectangular slot 25 is formed in the vicinity of the area 22-*a* subjected to higher thermal stresses. Stated otherwise, the embodiment of the present invention is featured in a structure in which the rectangular slot 25 is formed near the area where the outer periphery of the resin covering the metal plate 6 merges with the outer periphery of the metal plate 6.

With the embodiment of the present invention, flow speeds of the resins covering the upper and lower surfaces of the metal plate 6 can be changed so that the weld line 23 is deviated from the area 22-*a*, shown in FIG. 10, subjected to higher thermal stresses. In other words, flow speeds of the resins covering the upper and lower surfaces of the metal plate 6 can be adjusted depending on the location and size of the rectangular slot 25 formed in the metal plate 6. It is hence possible to adjust the position of occurrence of the weld line 23 that is an intrinsic disadvantage in the injection molding.

To explain the adjustment of the position of occurrence of the weld line 23 in more detail with reference to FIG. 16, the flow speeds of resins covering the upper and lower surfaces of the metal plate 6 are in the relationship of (speed of the resin 26 flowing along the lower surface of the metal plate 6 <speed of the resin 27 flowing along the upper surface of the metal plate 6). Namely, the upper resin 27 flows at a higher speed than the lower resin 26. When the injected resin (mold) flow comes close to the rectangular slot 25 formed in the metal plate 6, the upper resin 27 having a higher speed is divided into a resin 27-*a* flowing along the upper surface of the metal plate 6 and a resin 27-*b* flowing into the rectangular slot 25 formed in the metal plate 6. The divided upper resin 27-*b* joins again with the lower resin 26 and the divided upper resin 27-*a* near two sides of the rectangular slot 25 formed in the metal plate 6. Accordingly, there are two weld lines 23 near the two sides of the rectangular slot 25 formed in the metal plate 6. With the provision of the rectangular slot 25 formed in the metal plate 6, however, the upper resin 27-*b* flowing into the rectangular slot 25 can be caused to join with the lower resin 26 near one side of the rectangular slot 25, and the point at which the upper resin 27 joins with the lower resin 26 can be adjusted.

Further, as shown in FIG. 15, because the upper resin 27-*b* flows into the rectangular slot 25 formed in the metal plate 6 and advances from the upper surface to the lower surface of the metal plate 6, the directions of the glass fibers 24 in the upper resin 27-*b* are diffused so as to spread when the upper resin 27-*b* joins with the lower resin 26 on the lower surface of the metal plate 6. Consequently, in the vicinity of the area 22-*a*, the reduction of resin strength resulting from the orientation of the glass fibers 24 can be avoided.

Moreover, because the upper resin 27-*b* flows from the upper surface to the lower surface of the metal plate 6 through the rectangular slot 25 formed in the metal plate 6 before the resins are molded into a product, the resins after being joined on the lower surface of the metal plate 6 are easily movable and the weld line 23 is moved as indicated by a weld line 28. Further, because the joined resins flow while the upper resin 27-*b* and the lower resin 26 are pushed respectively along the upper surface and the lower surface of the metal plate 6, the resins are more easily mixed with each other and the size of the weld line 23 can be reduced as indicated by the weld line 28. In addition, because the joined resins are moved while mixing with each other, the directions of the glass fibers 24 are also more easily mixed with each other.

Furthermore, because the upper resin 27-*b* flowing along the upper surface of the metal plate 6 and cooled to a smaller extent flows into the lower resin 26 flowing along the lower surface of the metal plate 6 and cooled to a larger extent through the rectangular slot 25 formed in the metal plate 6, the joined resins can be even more easily mixed with each other upon movement of the weld line 23 and hence the directions of the glass fibers 24 can also be even more easily mixed with each other.

Likewise, the weld line 23 formed upon the divided upper resins 27-*a* and 27-*b* jointing with other again is also generated with the joining of both the resins before the resins are molded into a product. Therefore, the joined resins can be moved similarly to the weld line 28 and can be more easily mixed with each other upon the movement of the joined resins. It is hence possible to reduce the size of the weld line 23 like the weld line 28 and to make the orientations of the glass fibers 24 more easily mixed with each other.

According to the embodiment of the present invention, in the vicinity of the area 22-*a* subjected to higher thermal stresses, the position of the weld line 23 is deviated from the area subjected to higher thermal stresses and the directions of the glass fibers 24 are diffused for easier mixing. Consequently, the reduction of resin strength can be avoided and the occurrence of cracks can be suppressed. Further, even if cracks are produced, the size of the weld line can be reduced like the weld line 28 and the orientations of the glass fibers 24 can be more easily mixed with each other, whereby the fatigue crack growth rate can be retarded.

Figure 17:
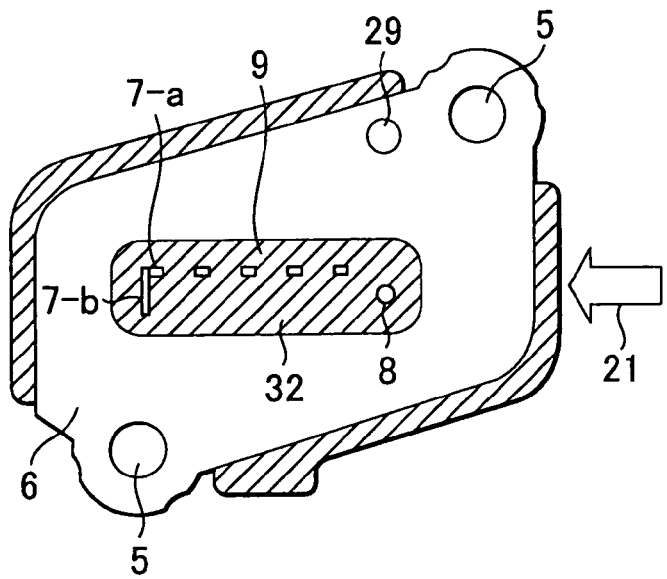
FIG. 17 is a sectional view corresponding to the sectional view taken along line C-C in FIG. 1 and showing a second example of a principal portion of the molded part for use in the thermal type air flow measuring instrument according to the first embodiment of the present invention, the molded part being formed by integral molding with the metal plate inserted therein.
Figure 18A:
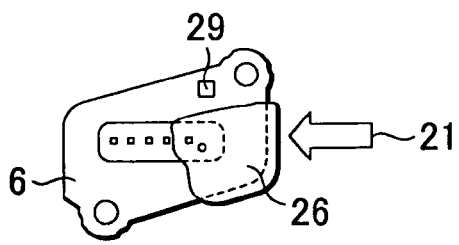
FIGS. 18A to 18F show a mold flow in the section corresponding to the sectional view taken along line B-B in FIG. 1 and show the second example of the principal portion of the molded part for use in the thermal type air flow measuring instrument according to the first embodiment of the present invention, the molded part being formed by integral molding with the metal plate inserted therein.
Figure 18B:
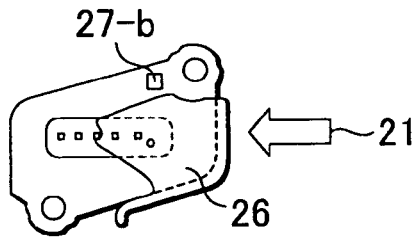
Figure 18C:
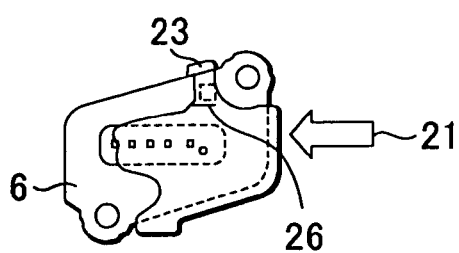
Figure 18D:
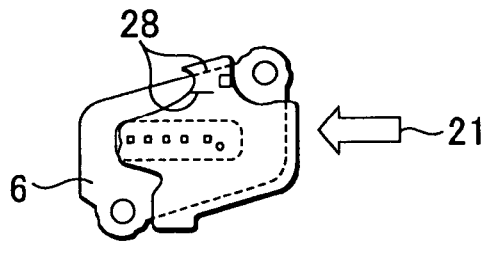
Figure 18E:
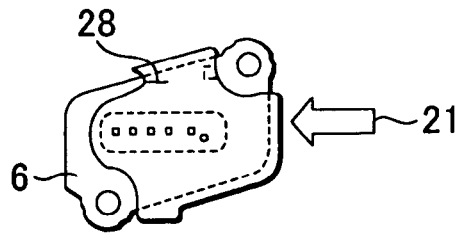
Figure 18F:
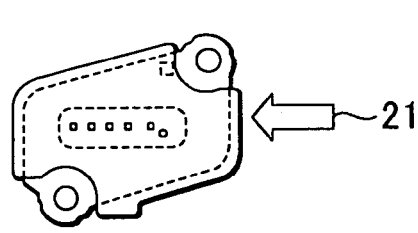
Figure 19:
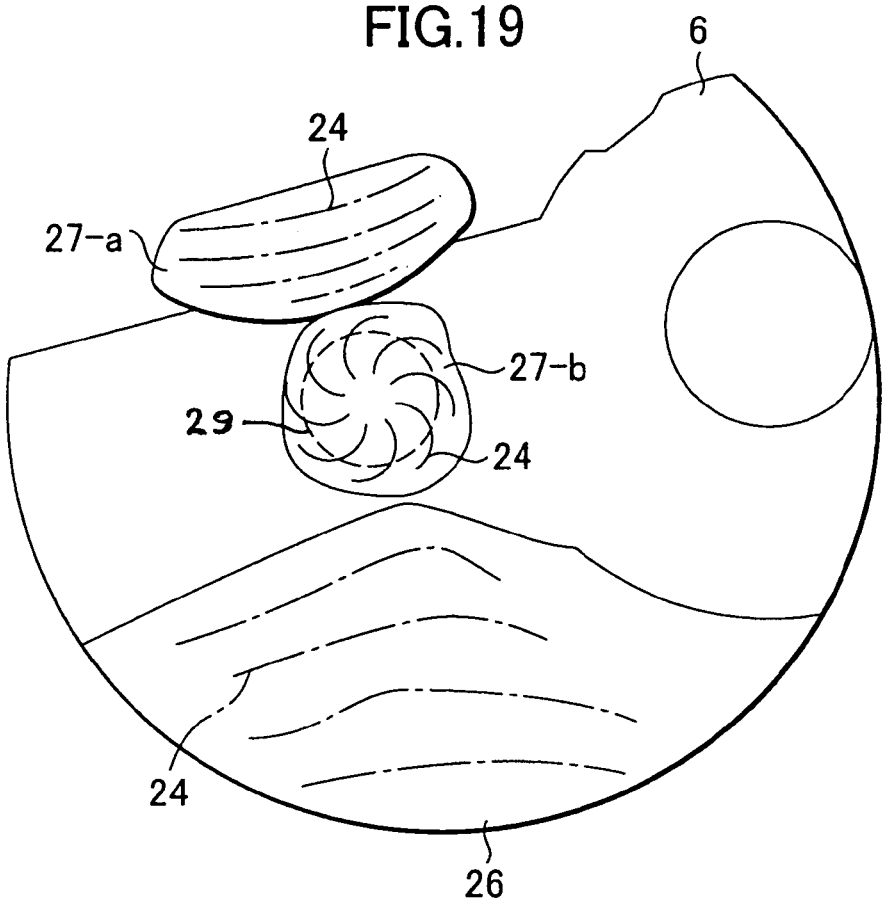
FIG. 19 is an enlarged view of the molded part shown in FIG. 18, the view corresponding to the enlarged view of the portion X in FIG. 11C and showing the second example of the principal portion of the molded part for use in the thermal type air flow measuring instrument according to the first embodiment of the present invention, the molded part being formed by integral molding with the metal plate inserted therein.

Another example of the molded part formed by integral molding with the metal plate inserted therein and used in the thermal type air flow measuring instrument according to the first embodiment of the present invention will be described below with reference to FIGS. 17 to 19. Here, a description is made of a measure for suppressing the occurrence of cracks and the growth of fatigue cracks resulting from the presence of the weld line. FIG. 17 is a sectional view corresponding to the section taken along line C-C in FIG. 1 and showing a second example of a principal portion of the molded part according to the first embodiment of the present invention. FIGS. 18A to 18F show a mold flow during the molding in the section corresponding to the section taken along line B-B in FIG. 1 and show the second example of the principal portion of the molded part according to the first embodiment. FIGS. 18A, 18B, 18C, 18D, 18E and 18F show the progress of the mold flow in sequence. FIG. 19 is an enlarged view of the molded part shown in FIG. 18 corresponding to the enlarged view of the portion X in FIG. 11C, the view showing the second example of the principal portion of the molded part according to the first embodiment and, in particular, directions of glass fibers.

In this example, the through portion 10 bored in the metal plate 6 and allowing only the resin covering the metal plate 6 to pass through the same is formed as a circular opening 29 and is provided in the vicinity of the area 22-*a* subjected to higher thermal stresses. Stated otherwise, this example is featured in a structure in which the opening 29 is formed near the area where the outer periphery of the resin covering the metal plate 6 merges with the outer periphery of the metal plate 6.

This example of the present invention can provide the following working advantages in addition to those ones described above with reference to FIGS. 1 to 9 and 14 to 16. As shown in FIG. 19, when the upper resin 27-*b* flows from the upper surface to the lower surface of the metal plate 6 through the circular opening 29 formed in the metal plate 6, the directions of the glass fibers 24 in the upper resin 27-*b* are evenly diffused to spread as if a flower opens. Consequently, evenness in directions of the glass fibers 24 can be further reduced, the reduction of resin strength resulting from the orientation of the glass fibers 24 can be more surely avoided, and the occurrence of cracks can be further suppressed.

Further, as shown in FIG. 18, the weld line 23, which is formed upon the divided upper resin 27-*b* jointing with the lower resin 26 and the divided upper resin 27-*a* again near the circumference of the opening 25 formed in the metal plate 6, can be formed as a nonlinear weld line 23. In addition, the weld line 23 can be made more easily moved and more easily mixed with each other. Therefore, the weld line 23 can be moved and can be reduced in size as indicated by 28. It is hence possible to further suppress the occurrence of cracks and retard the fatigue crack growth rate.

Figure 20:
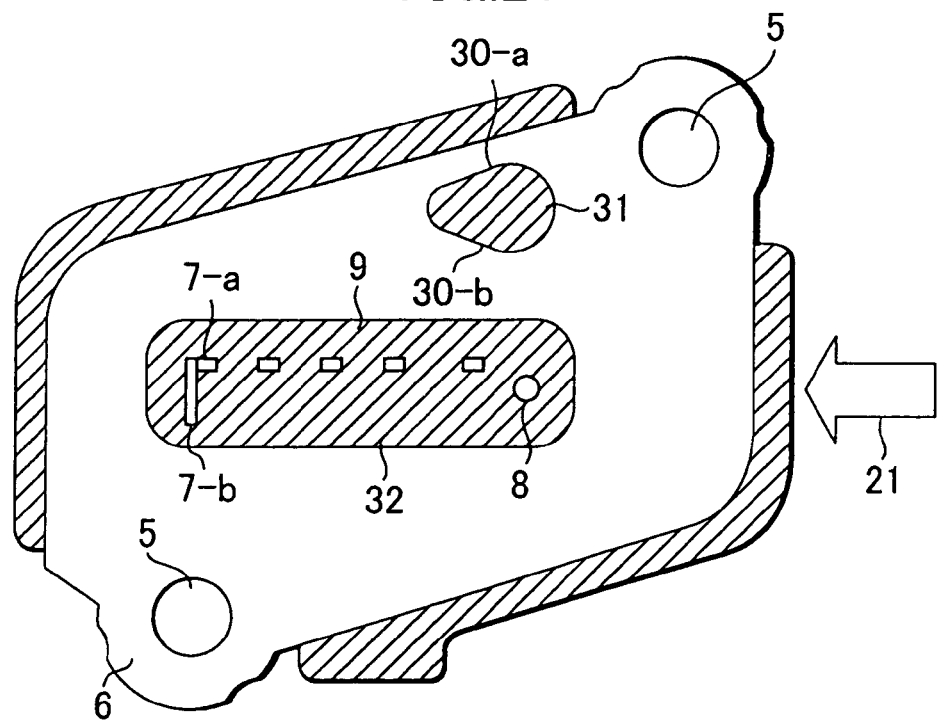
FIG. 20 is a sectional view corresponding to the sectional view taken along line C-C in FIG. 1 and showing a third example of the principal portion of the molded part for use in the thermal type air flow measuring instrument according to the first embodiment of the present invention, the molded part being formed by integral molding with the metal plate inserted therein.
Figure 21A:
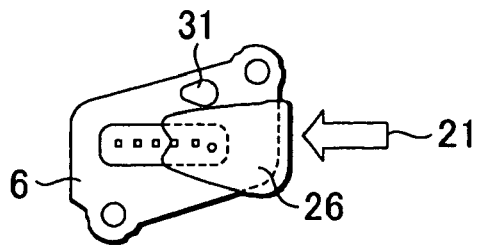
FIGS. 21A to 21F show a mold flow in the section corresponding to the sectional view taken along line B-B in FIG. 1 and show the third example of the principal portion of the molded part for use in the thermal type air flow measuring instrument according to the first embodiment of the present invention, the molded part being formed by integral molding with the metal plate inserted therein.
Figure 21B:
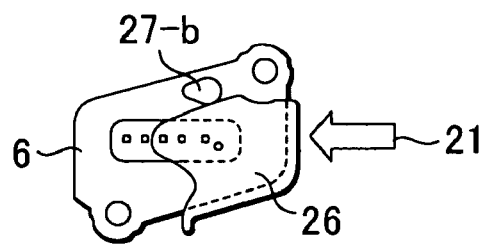
Figure 21C:
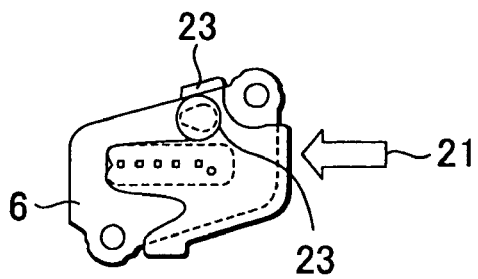
Figure 21D:
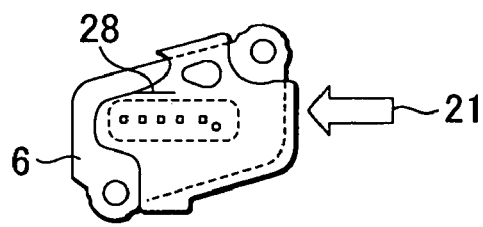
Figure 21E:
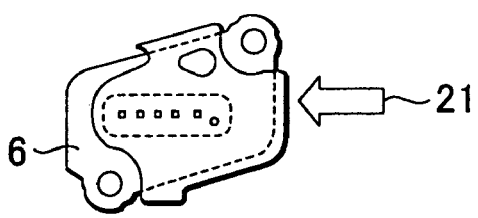
Figure 21F:
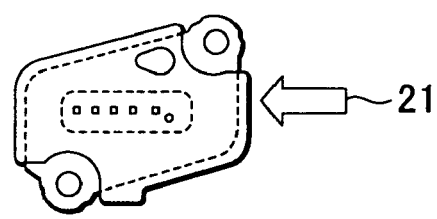

Still another example of the molded part formed by integral molding with the metal plate inserted therein and used in the thermal type air flow measuring instrument according to the first embodiment of the present invention will be described below with reference to FIGS. 20 and 21. Here, a description is made of a measure for suppressing the occurrence of cracks and the growth of fatigue cracks resulting from the presence of the weld line. FIG. 20 is a sectional view corresponding to the section taken along line C-C in FIG. 1 and showing a third example of the principal portion of the molded part according to the first embodiment of the present invention. FIGS. 21A to 21F show a mold flow during the molding in the section corresponding to the section taken along line B-B in FIG. 1 and show the third example of the principal portion of the molded part according to the first embodiment. FIGS. 21A, 21B, 21C, 21D, 21E and 21F show the progress of the mold flow in sequence.

In this example, the through portion 10 bored in the metal plate 6 and allowing only the resin covering the metal plate 6 to pass through the same is formed as an opening 31 obtained by interconnecting two circular openings of different diameters with two tangent lines. One tangent line 30-*a* is extended at an angle at which it is not parallel to the outer periphery of the metal plate 6 near the tangent line 30-*a*, and the other tangent line 30-*b* is extended at an angle at which it is not parallel to an outer periphery of the substantially rectangular opening 9, which is formed in the metal plate 6 near the tangent line 30-*b* and through which the connector terminal 7 and the vent hole 8 penetrate. The tangent lines 30-*a* and 30-*b* are extended so as to intersect in the direction of advance of the resin while defining the opening 31. Then, the opening 31 is provided in the vicinity of the area 22-*a*subjected to higher thermal stresses. Stated otherwise, this example is featured in a structure in which the opening 31 is formed near the area where the outer periphery of the resin covering the metal plate 6 merges with the outer periphery of the metal plate 6.

This example of the present invention can provide the following working advantages in addition to those ones described above with reference to FIGS. 1 to 19. Because the tangent line 30-*a* is formed at a certain angle relative to the outer periphery of the metal plate 6 and the tangent line 30-*b* is formed at a certain angle relative to the substantially rectangular opening 9 formed in the metal plate 6, the direction in which the divided resins advance and join with each other can be changed and an angle of the weld line 23 can be changed. Also, the angle of the weld line 23 can be adjusted by changing the sizes of the circles.

Further, because the tangent lines 30-*a* and 30-*b* are extended so as to intersect in the direction of advance of the resin, the weld line 23, which is formed upon the divided upper resin 27-*b* jointing with the lower resin 26 and the divided upper resin 27-*a* again near the periphery of the opening 31 formed in the metal plate 6, can be made more easily moved and more easily mixed with each other.

Therefore, the weld line can be moved and can be reduced in size. It is hence possible to further suppress the occurrence of cracks and retard the fatigue crack growth rate.

Returning to FIG. 1, etc., the occurrence of cracks and the growth of fatigue cracks in the housing 1 resulting from voids will be described below.

A description is here made of the molded part formed by integral molding with the metal plate inserted therein and used in the thermal type air flow measuring instrument according to the first embodiment of the present invention with reference to FIGS. 5 and 6.

The connector terminal 7 penetrating the metal plate 6 comprises a main terminal 7-*a* for electrically connecting the electronic circuit and the external device, and a sub connector terminal 7-*b* branched from an intermediate portion of an intermediate portion of the main terminal 7-*a*. The sub connector terminal 7-*b* is provided within the periphery of the substantially rectangular opening 9 formed in the metal plate 6, through which the connector terminal 7 and the vent hole 8 penetrate, and within the thickness of the metal plate 6. Then, the sub connector terminal 7-*b* is bent from the main terminal 7-*a* substantially perpendicularly to it and in a direction in which a resin 32 present in the substantially rectangular opening 9 formed in the metal plate 6 has a larger thickness.

With that feature of the present invention, it is possible to reduce a region where the temperature difference during the mold cooling between the inside and the outside of the resin 32, which is present within the substantially rectangular opening 9 formed in the metal plate 6, is locally increased, and hence to reduce the size of an initial void.

Figure 22:
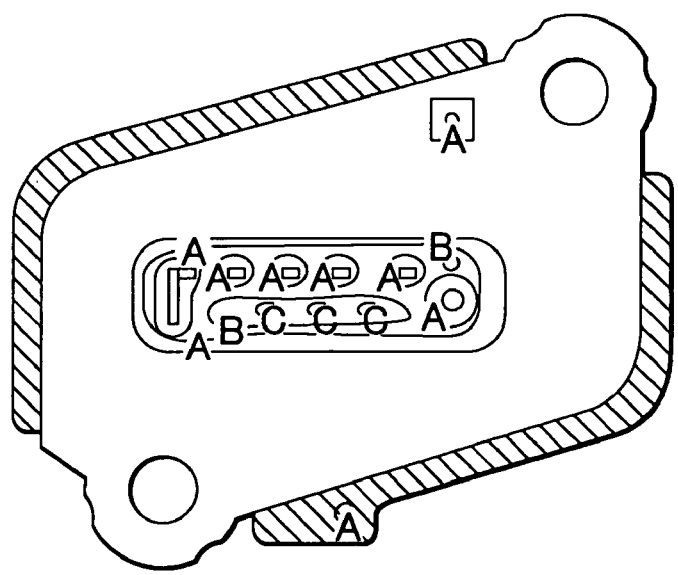
FIG. 22 shows a temperature distribution in a section corresponding to the sectional view taken along line C-C in FIG. 1 in the first embodiment of the present invention.

The advantage of the present invention based on the above feature will be described below in more detail with reference to FIG. 22. FIG. 22 shows a temperature distribution during the mold cooling in a section corresponding to the section taken along line C-C in FIG. 1. A, B and C in FIG. 10 represent temperature levels and satisfy the relationship of A<B<C.

The temperature difference during the mold cooling between the inside and the outside of the resin 32, which is present within the substantially rectangular opening 9 formed in the metal plate 6, is essentially determined depending the resin temperature and the molding-die temperature during the molding. When using a PBT (Polybutylene Terephthalate) resin containing glass fibers, the resin is generally molded at the resin temperature of about 260 (C and the molding-die temperature of about 80 (C. Thus, the resin temperature and the molding-die temperature are in the relationship of (resin temperature)>(molding-die temperature).

Generally, the outer temperature of the resin 32 is close to the molding-die temperature due to thermal conductivity of the metal plate 6, and the inner temperature of the resin 32 is close to the resin temperature. In this embodiment of the present invention, however, because the connector terminal 7, including the main terminal 7-*a* and the sub connector terminal 7-*b*, and a pin provided in the molding die for forming the vent hole 8 are present in the resin 32, the resin temperature near the connector terminal 7 and the pin for forming the vent hole 8 is close to the molding-die temperature due to thermal conductivity of the connector terminal 7 and the pin for forming the vent hole 8.

Thus, even in the structure in which the main terminal 7-*a* is disposed in a position offset from the center of the substantially rectangular opening 9 formed in the metal plate 6 and the temperature difference between the inside and the outside of the resin 32 tends to locally increase, since the sub connector terminal 7-*b* is disposed, as described above, to extend in the direction in which the resin has a larger thickness, i.e., in an area where the temperature difference between the inside and the outside of the resin tends to locally increase, a region where the temperature difference between the inside and the outside of the resin is actually increased can be reduced as indicated by the temperature distribution shown in FIG. 22, and hence the size of an initial void can be reduced.

Accordingly, even when a crack is produced from the initial void generated in the resin 32, the fatigue crack growth rate can be retarded because the size of the initial void is held down small.

While the sub connector terminal 7-*b* has been described above as being located within the thickness of the metal plate 6, a similar working advantage to that in this example of the present invention can also be obtained even with the sub connector terminal 7-*b* disposed to locate beyond the thickness of the metal plate 6.

Figure 23:
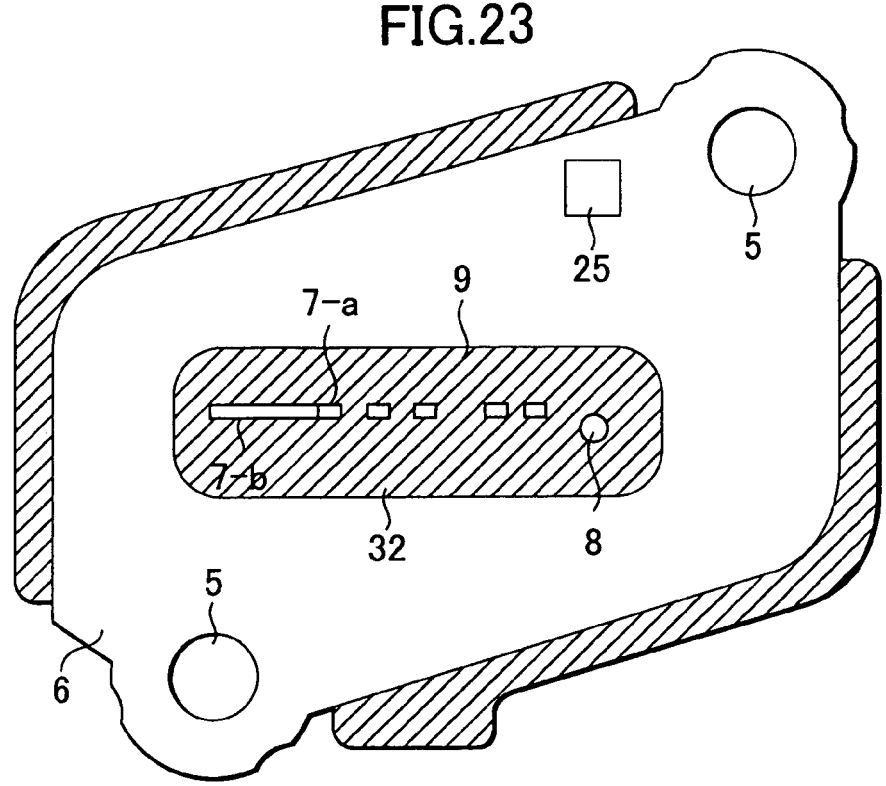
FIG. 23 is a sectional view corresponding to the sectional view taken along line C-C in FIG. 1 and showing a fourth example of the principal portion of the molded part for use in the thermal type air flow measuring instrument according to the first embodiment of the present invention, the molded part being formed by integral molding with the metal plate inserted therein.

Still another example of the molded part formed by integral molding with the metal plate inserted therein and used in the thermal type air flow measuring instrument according to the first embodiment of the present invention will be described below with reference to FIG. 23. Here, a description is made of a measure for suppressing the occurrence of cracks and the growth of fatigue cracks resulting from voids. FIG. 23 is a sectional view corresponding to the section taken along line C-C in FIG. 1 and showing a fourth example of the principal portion of the molded part according to the first embodiment of the present invention.

In this example, of the connector terminal 7, a sub connector terminal 7-*b* branched from an intermediate portion of a main terminal 7-*a* is provided within the periphery of the substantially rectangular opening 9 formed in the metal plate 6, through which the connector terminal 7 and the vent hole 8 penetrate, and within the thickness of the metal plate 6. Further, the sub connector terminal 7-*b* is in the form of a flat plate lying to extend in the same plane as the main terminal 7-*a* and in a direction in which the resin 32 present in the substantially rectangular opening 9 formed in the metal plate 6 has a larger thickness.

With this example of the present invention, since the sub connector terminal 7-*b* is in the form of a flat plate lying to extend in the same plane as the main terminal 7-*a*, the connector terminal 7 has a shape easier to manufacture. In addition, the working advantages described above with reference to FIGS. 1 to 22 are also obtained.

Figure 24:
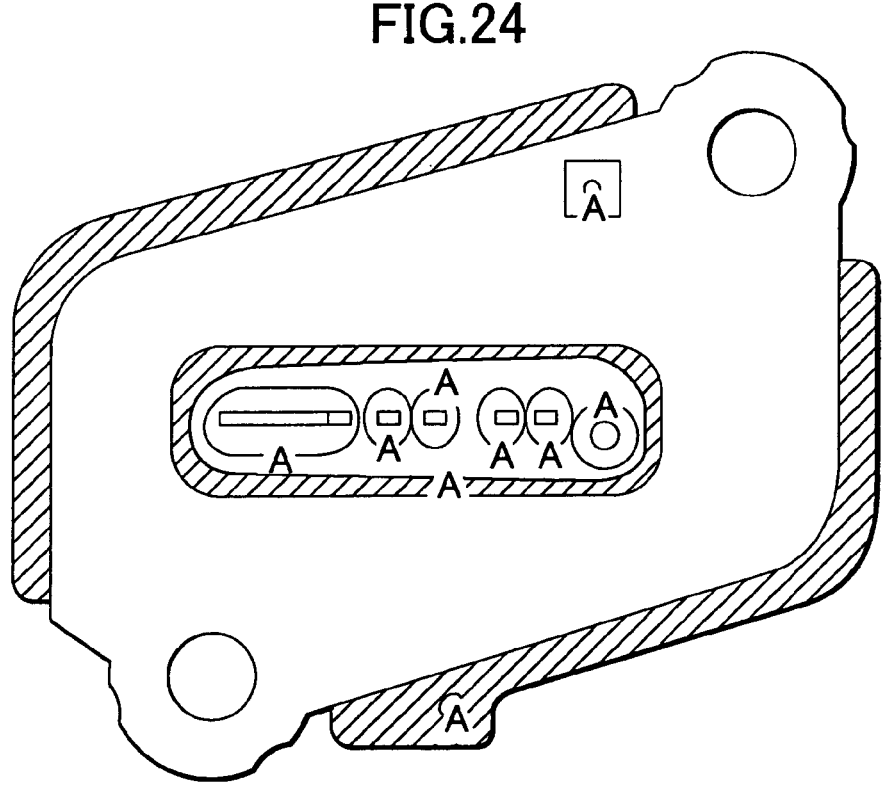
FIG. 24 shows a temperature distribution in the section corresponding to the sectional view taken along line C-C in FIG. 1 and shows the fourth example of the principal portion of the molded part for use in the thermal type air flow measuring instrument according to the first embodiment of the present invention, the molded part being formed by integral molding with the metal plate inserted therein.

FIG. 24 shows a temperature distribution during the mold cooling in a section corresponding to the section taken along line C-C in FIG. 1. Even in the structure in which the main terminal 7-*a* is disposed in a position near the center of the substantially rectangular opening 9 formed in the metal plate 6 and the temperature difference between the inside and the outside of the resin 32 present around the main terminal 7*a* in the substantially rectangular opening 9 tends to locally increase in some areas, since the sub connector terminal 7-*b*is disposed, in this example of the present invention, to extend in the direction in which the resin has a larger thickness, i.e., in an area where the temperature difference between the inside and the outside of the resin tends to locally increase, a region where the temperature difference between the inside and the outside of the resin is actually increased can be reduced as indicated by the temperature distribution shown in FIG. 24, and hence the size of an initial void can be reduced.

Accordingly, even when a crack is produced from a void generated in the resin 32, the fatigue crack growth rate can be retarded because the size of the initial void is held down small.

While the sub connector terminal 7-*b* has been described above as being located within the thickness of the metal plate 6, a similar working advantage to that in this example of the present invention can also be obtained even with the sub connector terminal 7-*b* disposed to locate beyond the thickness of the metal plate 6.

Returning to FIG. 1, etc., the occurrence of cracks and the growth of fatigue cracks in the housing 1 resulting from combination of a void and a weld line will be described below.

A description is here made of the molded part formed by integral molding with the metal plate inserted therein and used in the thermal type air flow measuring instrument according to the first embodiment of the present invention with reference to FIG. 5.

In FIG. 5, the main terminal 7-*a* and the vent hole 8 are disposed in the resin 32, which is present in the substantially rectangular opening 9 formed in the metal plate 6, so as to offset from each other as viewed from the injection direction 21. Also, the vent hole 8 is disposed such that, as viewed from the injection direction 21, the vent hole 8 is offset from the main terminal 7-*a* in the same direction as the extension of the sub connector terminal 7-*b* within the extent of the sub connector terminal 7-*b*, which is branched from an intermediate portion of the main terminal 7-*a* and is provided within the periphery of the substantially rectangular opening 9 formed in the metal plate 6 and within the thickness of the metal plate 6. Furthermore, the injecting direction 21 in molding of the housing 1 is set substantially perpendicular to the open surface of the housing frame-shaped portion 1-*a*, which is positioned nearer to the vent hole 8, and substantially parallel and straightforward relative to the screw fastening surface of the metal plate 6.

That feature of the present invention makes it possible to suppress an increase of the fatigue crack growth rate, which is caused, in particular, with combination of a void generated inside the resin present in the substantially rectangular opening 9 formed in the metal plate 6 and a weld line generated with the presence of the pin, acting as an interference (obstacle), which is provided in the molding die to position in the substantially rectangular opening 9 for forming the vent hole 8.

Figure 25:
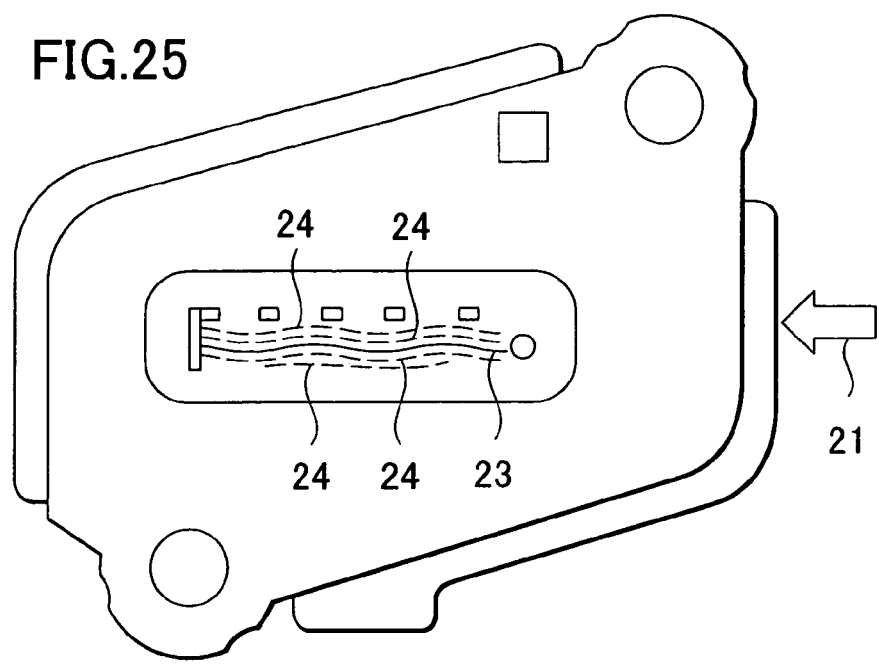
FIG. 25 shows weld lines and glass fibers in the section corresponding to the sectional view taken along line C-C in FIG. 1 in the first embodiment of the present invention.

The advantage of the above feature of the present invention will be described in more detail with reference to FIG. 25. The weld line 23 generated with the presence of the vent hole 8 is positioned behind the vent hole 8 in the injecting direction 21. Also, because the vent hole 8 has a circular shape to prevent stresses from being concentrated on the resin 32, it is conventional that the weld line 23 generated behind the vent hole 8 is extended straight and the directions of the glass fibers 24 are substantially parallel to the weld line 23. Therefore, the resin strength is particularly reduced, and the occurrence of cracks and an increase of the fatigue crack growth rate are promoted along the weld line 23. In addition, because the weld line 23 generated from the vent hole 8 is extended in a structure where a small initial void is apt to relatively easily occur, the fatigue crack growth rate is further accelerated. With the above-mentioned feature of the present invention, however, the advance of the weld line 23 generated from the vent hole 8 is blocked by the sub connector terminal 7-*b*, and the directions of the glass fibers 24 are changed by the sub connector terminal 7-*b* toward a direction substantially perpendicular to the weld line 23. Accordingly, even when a crack is produced and developed with fatigue along the weld line 23, the fatigue crack growth rate can be extremely retarded in an area behind the sub connector terminal 7-*b*. As a result, the crack growth can be suppressed to such an extent as not affecting reliability.

Figure 26:
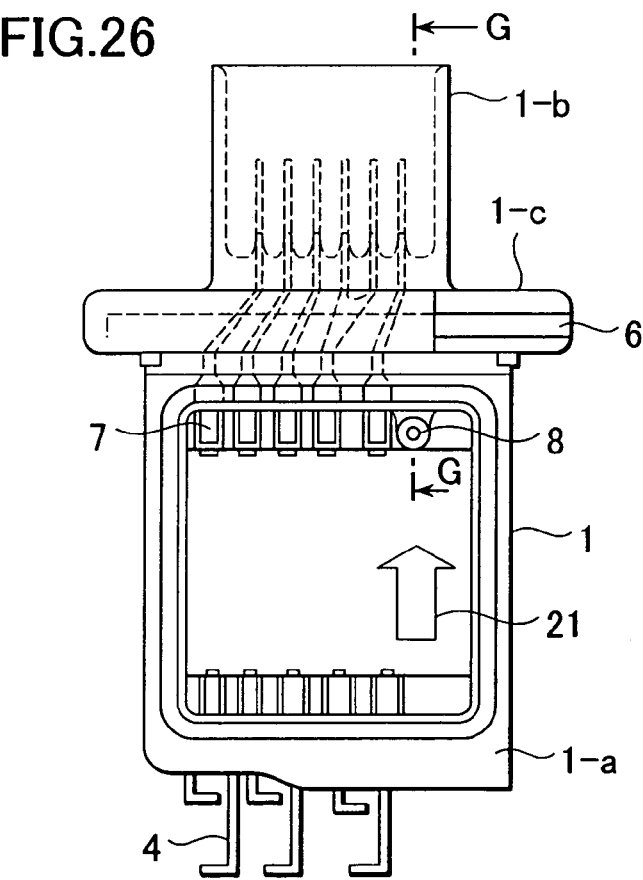
FIG. 26 is a front view corresponding to FIG. 1 and showing a fifth example of the principal portion of the molded part for use in the thermal type air flow measuring instrument according to the first embodiment of the present invention, the molded part being formed by integral molding with the metal plate inserted therein.

Still another example of the molded part formed by integral molding with the metal plate inserted therein and used in the thermal type air flow measuring instrument according to the first embodiment of the present invention will be described below with reference to FIG. 26. Here, a description is made of a measure for suppressing the occurrence of cracks and the growth of fatigue cracks resulting from combination of a void and a weld line. FIG. 26 is a front view corresponding to the front view shown in FIG. 1 and showing a fifth example of the principal portion of the molded part according to the first embodiment of the present invention. FIG. 27 is a sectional view taken along line G-G in FIG. 26.

In this example of the present invention, the injecting direction 21 in the molding is changed from that shown in FIG. 1. More specifically, the injecting direction 21 is set substantially perpendicular to the open surface of the housing frame-shaped portion 1-*a* and substantially perpendicular to the screw fastening surface of the metal plate 6. Also, in order to avoid the resin pressure produced during the molding from being imposed on the metal plate 6, the resin injection in the injecting direction 21 is restricted within the periphery of the substantially rectangular opening 9 formed in the metal plate 6, through which the connector terminal 7 and the vent hole 8 penetrate. Further, the resin injection in the injecting direction 21 is set substantially straightforward relative to the vent hole 8 within the extent of the housing frame-shaped portion 1-*a*.

By so setting the injecting direction 21 in this example of the present invention, the metal plate 6 can be prevented from being directly subjected to the resin pressure during the injection molding, and it can be avoided from being deformed with a high pressure produced during the injection molding. Further, the injection pressure produced during the injection molding can be applied so as to push two pins against each other, which are provided in the molding die in a substantially perpendicular relation to form the vent hole 8 having an L-shape and formed in the housing frame-shaped portion 1-*a*. It is hence possible to prevent the vent hole 8 from being not formed due to falling of the pins with the high pressure applied during the injection molding, and to realize the molding in a more satisfactory manner.

This example of the present invention can provide the following working advantage in addition to those ones described above with reference to FIGS. 1 to 25. Particularly, it is possible to avoid combination of an initial void generated inside the resin 32 present in the substantially rectangular opening 9 formed in the metal plate 6 and a weld line generated with the presence of the pin, acting as an interference (obstacle), which is provided in the molding die to position in the substantially rectangular opening 9 for forming the vent hole 8. Consequently, even when a crack is produced, the fatigue crack growth rate can be retarded.

To describe the advantage of this example of the present invention in more detail, the weld line 23 generated with the presence of the vent hole 8 is formed behind the vent hole 8 as viewed from the injecting direction 21. Therefore, when the injecting direction 21 is set as in this example, the weld line 23 generated with the presence of the vent hole 8 is formed in a direction toward the housing connector portion 1-c. Hence, an area in which a small initial void is relatively easily produced in the resin 32 can be prevented from overlapping with the weld line 23, and particularly the fatigue crack growth rate can be retarded. As a result, the crack growth can be suppressed to such an extent as not affecting reliability.

Still another example of the molded part formed by integral molding with the metal plate inserted therein and used in the thermal type air flow measuring instrument according to the first embodiment of the present invention will be described below with reference to FIG. 28. FIG. 28 is a set of a plan view and a front view corresponding to the front view shown in FIG. 1 and showing still another example of the molded part according to the first embodiment of the present invention.

In this example, unlike the embodiment shown in FIG. 1, the main terminal 7-a of the connector terminal 7 is bent substantially at a right angle. Also, the main terminal 7-a is bent toward the cover 18-a covering the open surface of the housing frame-shaped portion 1-a. Further, the housing connector portion 1-b is also bent from the housing fixing portion 1-c at the same angle as that at which the main terminal 7-a is bent.

With that structure, even in such a shape as not capable of implementing partial thinning to prevent thickening of the resin 32 present in the substantially rectangular opening 9 formed in the metal plate 6, through which the connector terminal 7 and the vent hole 8 penetrate, similar working advantages to those ones described above with reference to FIGS. 1 to 27 can also be obtained by employing the structure/arrangement of the metal plate 6, the connector terminal 7 and the injecting direction 21 as shown in FIGS. 1 to 27. It is hence possible to suppress the occurrence of cracks and retard the fatigue crack growth rate, which is generated or promoted with the presence of a weld line or a void and combination of a weld line or a void.

Figure 29:
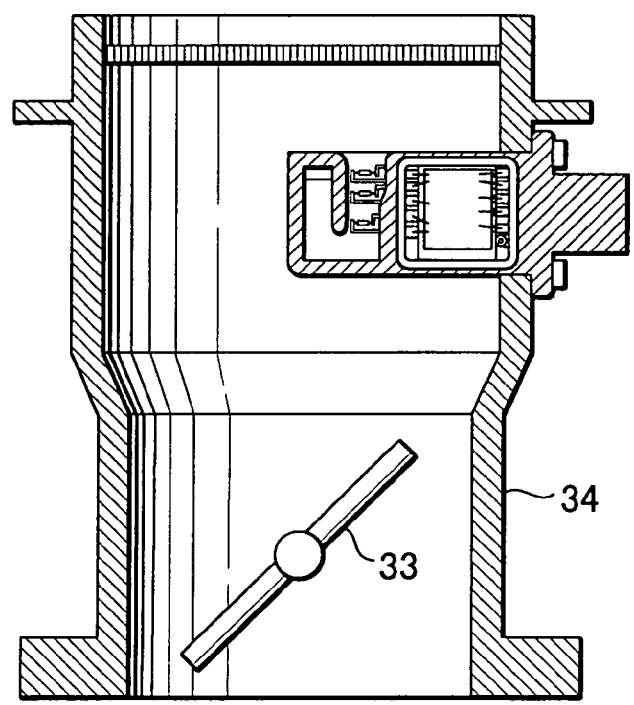
FIG. 29 is a cross-sectional view showing an overall construction of a thermal type air flow measuring instrument according to a second embodiment of the present invention.

FIG. 29 is a sectional view of a throttle body 34 having a valve 33 to control intake air in an engine, the view showing a second embodiment of the present invention. In the throttle body 34, an air flow meter integrally provided with an auxiliary passage is arranged upstream of the valve 33. The air flow meter has the same structure as that of one of the examples shown in FIG. 1 to 27, and can provide similar working advantages to those ones obtained with them.

While the second embodiment has been described in connection with the throttle body 34, the present invention is also applicable to other type of body having the valve 33 to control intake air in an engine, e.g., an ETC (Electric Throttle) body, while ensuring the similar working advantages.

Figure 30:
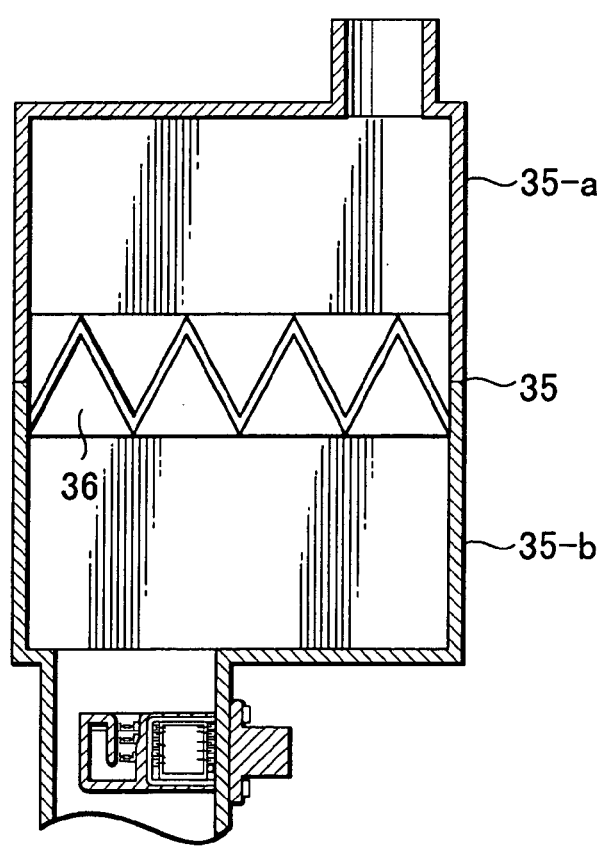
FIG. 30 is a cross-sectional view showing an overall construction of a thermal type air flow measuring instrument according to a third embodiment of the present invention.

FIG. 30 is a partial sectional view of an air cleaner 35 disposed in an engine room, the view showing a second embodiment of the present invention. The air cleaner 35 has a structure in which a filter member 36 for removing dust is fixedly sandwiched between an upstream casing component 35-a having an introducing duct to take in intake air flow and a downstream casing component 35-b having a duct to introduce the intake air to the engine room. An air flow meter integrally provided with an auxiliary passage is arranged in the downstream casing component of the air cleaner. The air flow meter has the same structure as that of one of the examples shown in FIG. 1 to 27, and can provide similar working advantages to those ones obtained with them.

Figure 31:
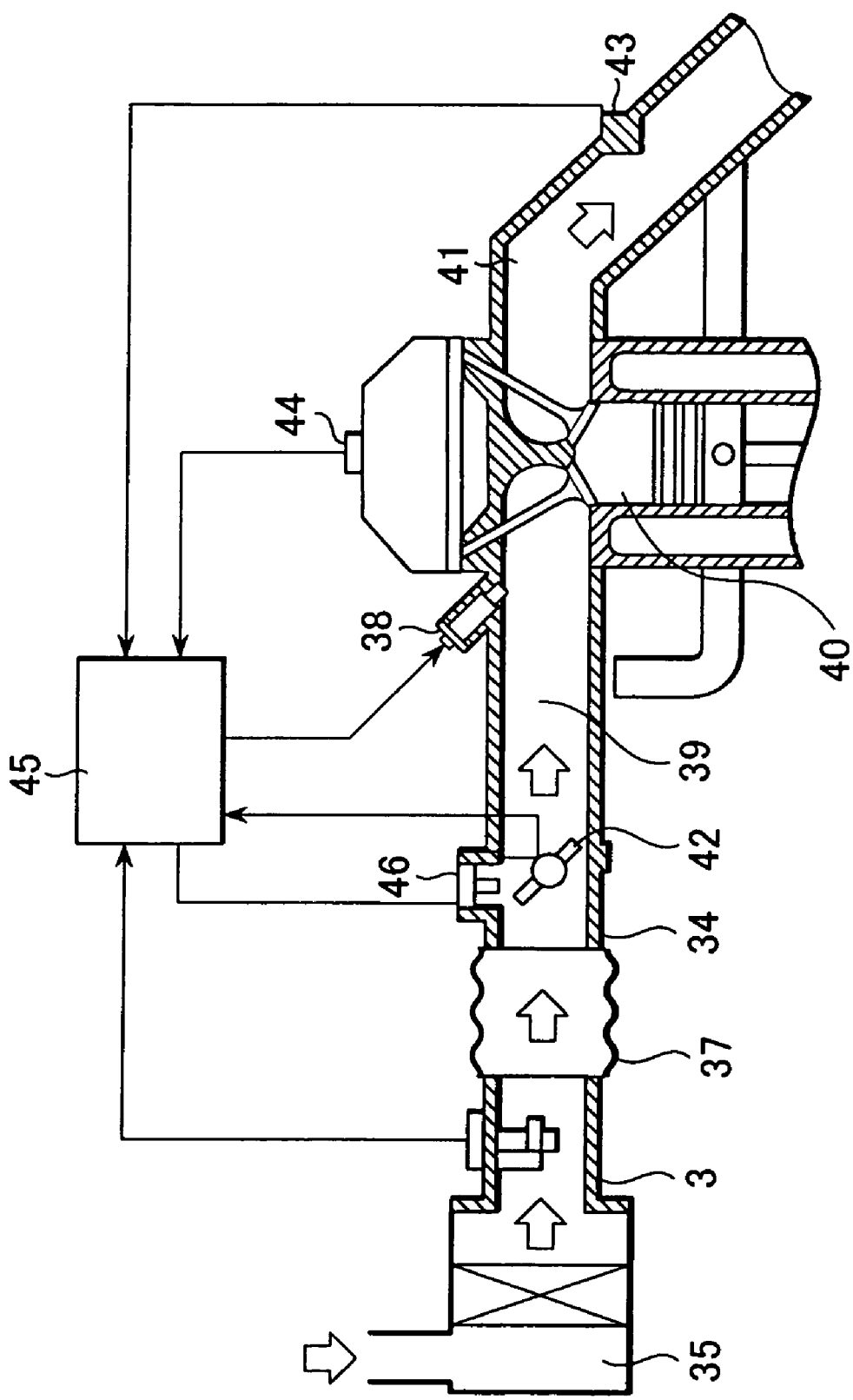
FIG. 31 is a schematic view showing the construction of an engine control system using the thermal type air flow measuring instrument according to each of the embodiments of the present invention.

FIG. 31 shows an engine control system in which the present invention is applied to an internal combustion engine of electronic injection type.

Intake air taken in through an air cleaner 35 is introduced to an engine cylinder 40 through an air flow measuring body 3, an intake duct 37, a throttle body 34, and an intake manifold 39 provided with an injector 38 to which fuel is supplied. On the other hand, gas generated in the engine cylinder is exhausted through an exhaust manifold 41. A control unit 45 receives an air flow signal outputted from an electronic circuit in a thermal type air flow meter, a throttle valve angle signal outputted from a throttle angle sensor 42, an air/fuel ratio signal outputted from an air/fuel ratio sensor 43 disposed in the intake manifold, and a rotational angle signal outputted from an engine speed meter 44. Then, the control unit 45 processes those signals to determine an optimum an optimum injection amount and to control an idle air control valve 46. The air flow meter has the same structure as that of one of the examples shown in FIG. 1 to 9 and 14 to 27, and can provide similar working advantages to those ones obtained with them.

According to the present invention, the occurrence of cracks in a part molded with a metal plate inserted therein can be reduced and reliability of a thermal type air flow measuring instrument can be improved.

What is claimed is:

1. A thermal type flow measuring instrument comprising:
    a sensing element for sensing an air flow;
    an electronic circuit electrically connected to said sensing element; and
    a frame- or box-shaped plastic casing component for accommodating and protecting said electronic circuit, said plastic casing component being a housing constructed from plastic as an injection molded part formed by integral molding together with a connector terminal which is extended from an inside to an outside of said plastic casing component while penetrating therethrough for electrical connection of said electronic circuit to an external device,
    said housing further including a fixing portion molded from plastic with a metal plate inserted therein for attachment to a duct component serving as a passage through which a fluid to be measured flows, said metal plate being entirely or partially covered with the plastic, and said metal plate having an opening formed adjacent a corner of said metal plate in a plastic-covered portion thereof, said opening being filled with said plastic to thereby join the plastic on one surface of said metal plate with the plastic on an opposite surface of said metal plate.

2. A thermal type flow measuring instrument according to claim 1, wherein said fixing portion has a flange formed by integral molding said metal plate, and said metal plate has a hole through which said connector terminal penetrates and which is filled with the plastic.

3. A thermal type flow measuring instrument according to claim 1, wherein said opening serves as a flow passage to introduce molten plastic from one surface to an opposite surface of said metal plate, or said opening serves to interfere with a flow of the molten plastic so that speds of the molten plastics flowing along both the surfaces of said metal plate differ from each other during injection molding of said housing.

4. A thermal type flow measuring instrument according to claim 1, wherein said opening acts to form a weld line of the plastics molded to form said housing in a position inside an outer periphery of said metal plate.

5. A thermal type flow measuring instrument according to claim 1, further comprising a sensing element for sensing an air flow and an electronic circuit electrically connected to said sensing element, and
wherein said connector terminal has a sub connector terminal branched from said connector terminal, and said sub connector terminal is extended in a portion in which a plastic molded to form said housing has a relatively large thickness.

6. A thermal type flow measuring instrument according to claim 5, wherein said sub connector terminal branched from said connector terminal has a fore end remaining in said plastic molded to form said plastic casing component and is not exposed to the exterior.

7. A thermal type flow measuring instrument according to claim 5, wherein said sub connector terminal is formed at an inclination so that flow directions of molten plastics during injection molding of said housing differ from each other between an upstream side and a downstream side of said sub connector terminal.

8. A thermal type flow measuring instrument according to claim 1, further comprising a sensing element for sensing an air flow and an electronic circuit electrically connected to said sensing element and along said connector terminal from an inside to an outside of said housing while penetrating therethrough, and a gate for injection molding of said housing is formed near an end of said vent pipe to flow a molten plastic in a direction parallel to a longitudinal direction of said vent pipe.

9. A thermal type flow measuring instrument according to claim 8, wherein a direction in which the plastic is injected from said gate is substantially perpendicular to said metal plate, and an extend of the injection is within a projected area of an opening formed in special metal plate, through which said connector terminal penetrates.

10. An engine-control system comprising a thermal type flow measuring instrument according to claim 1, fuel delivery means, and a controller for controlling said fuel delivery means in accordance with a signal from said thermal type flow measuring instrument.

* * * * *